United States Patent [19]
Endou et al.

[11] Patent Number: 5,808,451
[45] Date of Patent: Sep. 15, 1998

[54] POWER DEVICE FOR INTERNAL COMBUSTION ENGINE

[75] Inventors: Tsuneaki Endou; Tetsuya Kondo, both of Numazu, Japan

[73] Assignee: Kokusan Denki Co., Ltd., Shizuoka-ken, Japan

[21] Appl. No.: 580,811

[22] Filed: Dec. 29, 1995

[51] Int. Cl.⁶ .................................................. H02P 9/00
[52] U.S. Cl. .................. 322/24; 322/28; 322/25
[58] Field of Search ................... 322/28, 24, 25

[56] References Cited

U.S. PATENT DOCUMENTS

| | | | |
|---|---|---|---|
| 4,382,222 | 5/1983 | Kurtz et al. | 320/61 |
| 4,459,536 | 7/1984 | Wirtz | 322/10 |
| 4,780,619 | 10/1988 | Campbell et al. | 307/10 R |
| 4,811,185 | 3/1989 | Cook et al. | 365/17 |
| 5,448,154 | 9/1995 | Kanke et al. | 322/28 |
| 5,543,703 | 8/1996 | Kusase et al. | 322/16 |

FOREIGN PATENT DOCUMENTS

| | | |
|---|---|---|
| 59-35538 | 2/1984 | Japan . |
| 5-344798 | 12/1993 | Japan . |
| 5-344799 | 12/1993 | Japan . |

*Primary Examiner*—Steven L. Stephan
*Assistant Examiner*—Nicholas Ponomarenko
*Attorney, Agent, or Firm*—Pearne, Gordon, McCoy & Granger LLP

[57] ABSTRACT

A boosting switch circuit is constituted by a plurality of MOSFETs of which drains are respectively connected to a plurality of output terminals of an AC magneto and sources are connected to each other or together. The MOSFETs each have a parasitic diode in a drain-source circuit thereof. The parasitic diodes and a plurality of rectification diodes are subjected to bridge connection, to thereby provide a rectifying circuit for rectifying an AC output voltage of the AC magneto. The MOSFETs are fed at a gate thereof with a drive signal of a rectangular waveform, resulting in being concurrently subjected to on-off operation. This permits the output voltage of the AC magneto to be boosted and then rectified through the rectifying circuit. The output voltage thus boosted and rectified is then fed to a load.

10 Claims, 13 Drawing Sheets

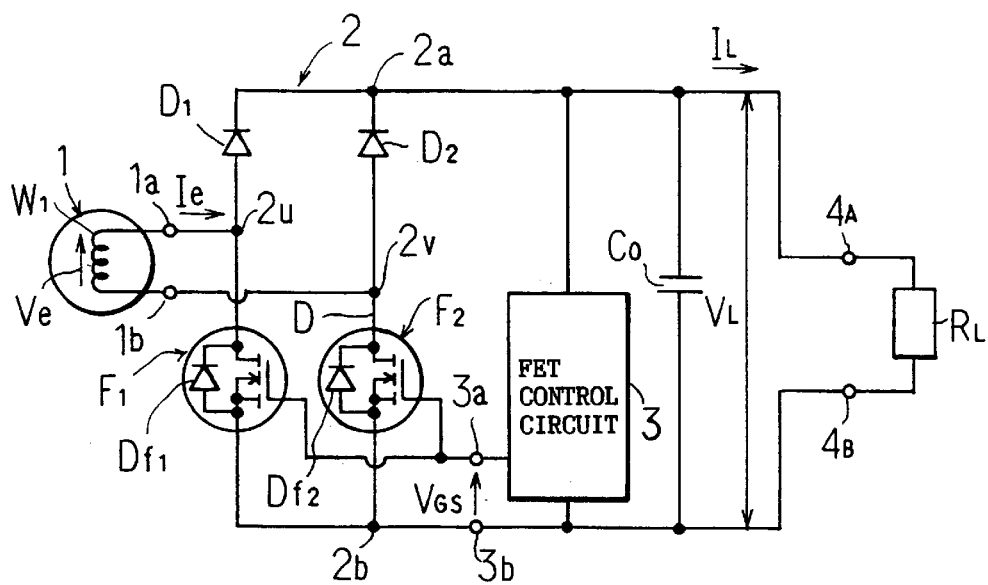
Fig. 1
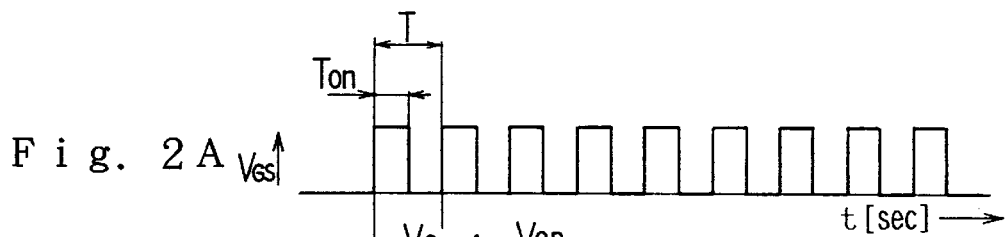
Fig. 2A
Fig. 2B
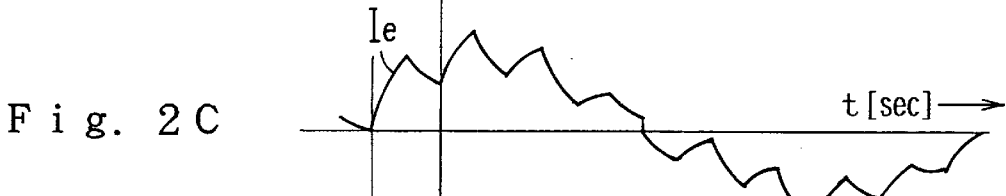
Fig. 2C
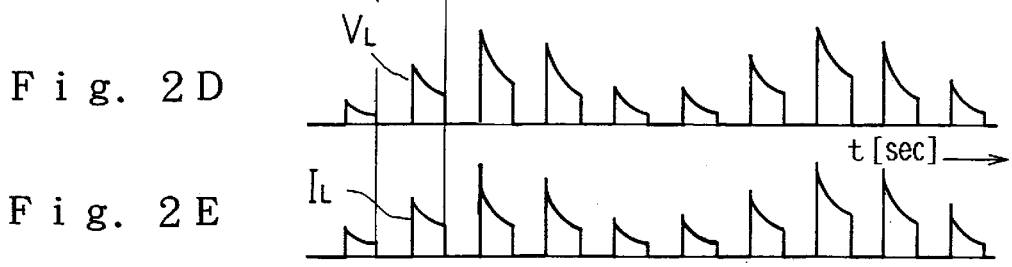
Fig. 2D
Fig. 2E Fig. 3
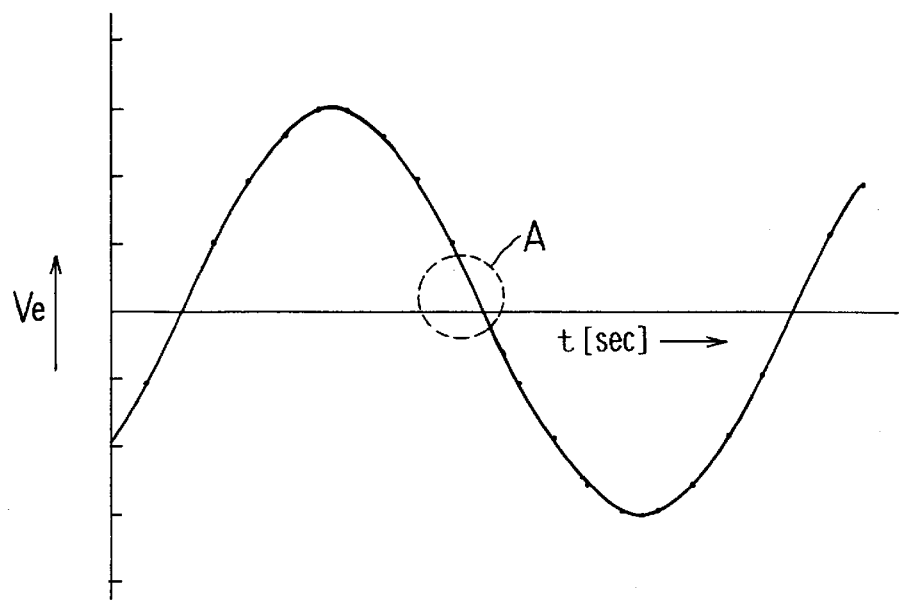
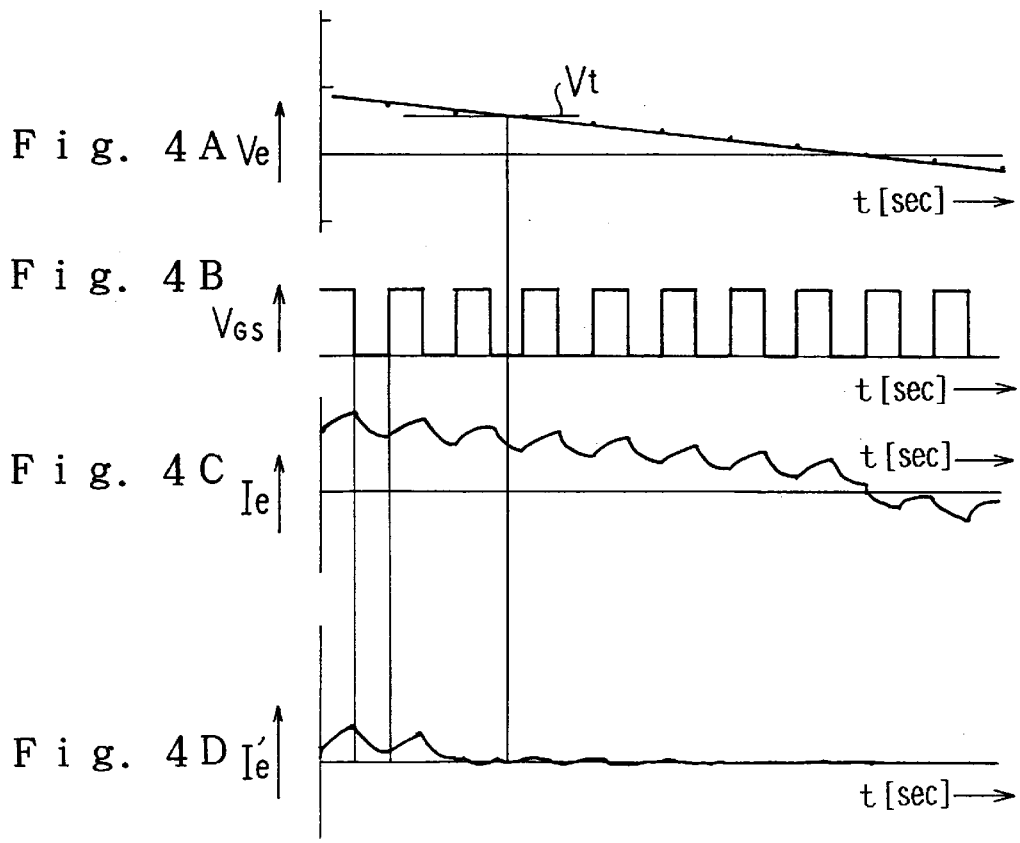
Fig. 4A
Fig. 4B
Fig. 4C
Fig. 4D Ve VGs
+10V VDs

ID

Pch

Fig. 18
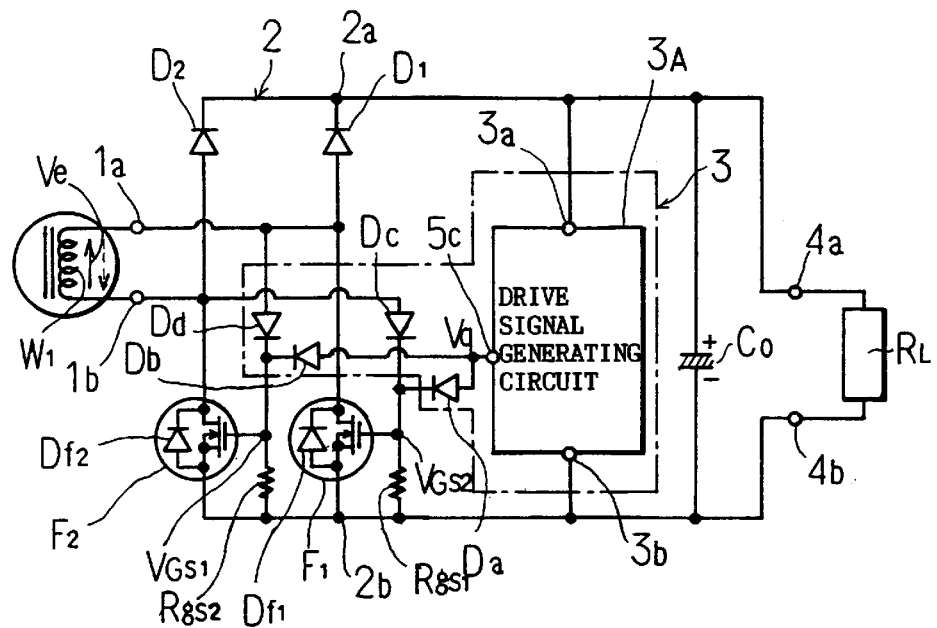
Fig. 19A $V_e$
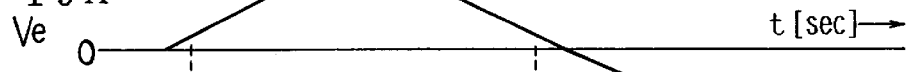
t [sec]
Fig. 19B $V_q$ +10V
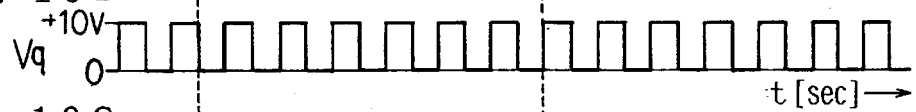
t [sec]
Fig. 19C $V_{GS1}$ +10V
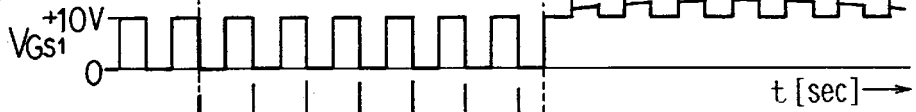
t [sec]
Fig. 19D $V_{DS1}$
t [sec]
Fig. 19E $I_{D1[A]}$
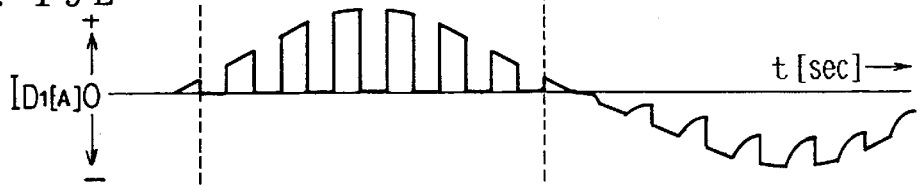
t [sec]
Fig. 19F $P_{ch1}$
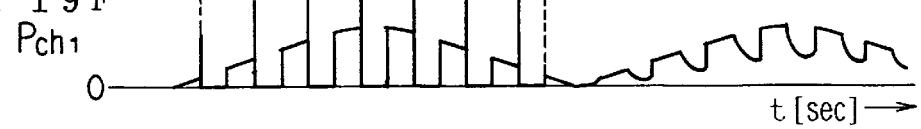
t [sec]

Fig. 21C VGS2 +10V

Fig. 21D VGS1 +10V

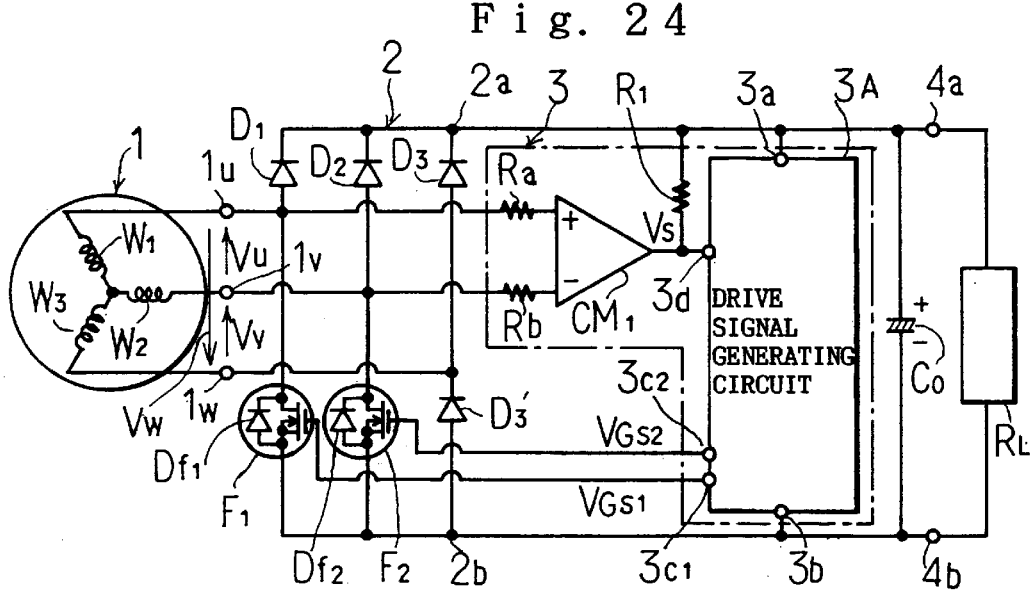
Fig. 24
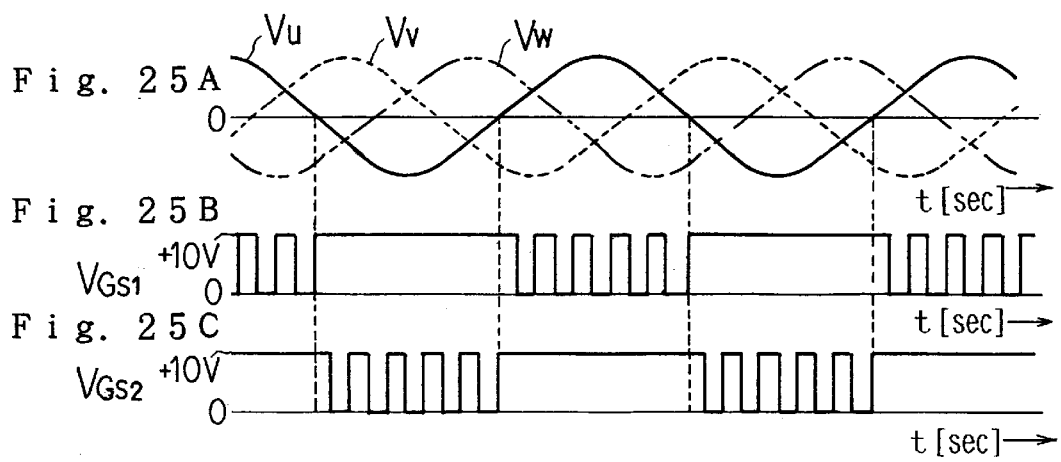
Fig. 25A
Fig. 25B
Fig. 25C

Ve

Vs $V_{GS1}$ $V_{GS2}$

# POWER DEVICE FOR INTERNAL COMBUSTION ENGINE

BACKGROUND OF THE INVENTION

This invention relates to a power device for an internal combustion engine, and more particularly to a power device for an internal combustion engine which is adapted to generate an output for driving a load while permitting an AC magneto mounted on the internal combustion engine to serve as a power supply.

A generator which has been conventionally mounted on an internal combustion engine is generally constituted by an AC magneto including a magnet rotor mounted on an output shaft of the engine and a stator fixed on a casing of the engine or a cover thereof. The AC magneto generates an alternating current; therefore, when a vehicle is provided with electrical parts required to be driven by a direct current, it is required to arrange a rectification circuit for converting an AC output of the AC magneto into a DC output.

When a battery is mounted on a vehicle, a working equipment or the like which is driven by the internal combustion engine, the battery and a DC load are connected in parallel across the rectification circuit for rectifying the output of the AC magneto. This results in an electric power being fed from the battery to the load while a rotation speed of the internal combustion engine is decreased to a degree sufficient to cause the output voltage of the AC magneto to be below a terminal voltage of the battery and being fed from the AC magneto to the load when the output voltage of the AC magneto is above the terminal voltage of the battery.

Recently, it has been considered that in an internal combustion engine for a vehicle, a working equipment or the like which is constructed so as not to be mounted with any battery, a power device in which an AC magneto mounted on the engine is used as a power supply for driving a fuel pump, an injector and a microcomputer for controlling the fuel pump and injector.

In order to ensure that the power device in which the AC magneto driven by the internal combustion engine is used as the power supply generates an output necessary to drive a load during low-speed operation of the internal combustion engine as well, it is considered to increase the number of windings of a generating coil, to thereby. increase an output voltage thereof. Unfortunately, an increase in the number of windings of the generating coil leads to an increase in inductance of the generating coil, as well as an increase in resistance of the generating coil, resulting in an impedance of the generating coil being increased. Such an increase in impedance of the generating coil causes an output voltage of the magneto to be reduced during medium-speed or high-speed operation of the internal combustion engine to a degree sufficient to fail to feed the load with an adequate electric power.

Thus, a demand of increasing an output voltage of the AC magneto when the engine speed is reduced and that of feeding the load with an electric power of a sufficient level are contrary to each other for the AC magneto, so that the prior art fails to provide a power device which is capable of meeting both demands.

In view of the above, a power device is proposed which includes a full-wave rectification circuit for rectifying a voltage induced across a generating coil of an AC magneto, transistors each having a collector-emitter circuit connected between each of output terminals of the generating coil and a DC output terminal on a negative side of the full-wave rectification circuit and acting as a boosting switch, and a control circuit for on-off operation of each of the transistors. The proposed power device is disclosed in Japanese Patent Application Laid-Open Publication No. 344798/1993 and Japanese Patent Application Laid-Open Publication No. 344799/1993. The power device proposed is so constructed that when each of the transistors is turned on, a short-circuit current is permitted to flow through the transistor and one of diodes constituting the full-wave rectification circuit to the generating coil; whereas when the transistor is turned off, the short-circuit current is interrupted to induce a boosted voltage across the generating coil. The voltage induced is then rectified by the full-wave rectification circuit and then fed to a load.

Such construction of the proposed power device permits an increased voltage to be induced across the generating coil of the AC magneto during low-speed operation of an internal combustion engine as well, resulting in the load being driven during the low-speed operation as well. Also, it permits the number of windings of the generating coil of the AC magneto to be decreased to a degree sufficient to prevent a reduction in output voltage of the magneto during both middle-speed operation and high-speed operation of the engine.

Nevertheless, the conventional power device disclosed in each of Japanese Patent Application Laid-Open Publication No. 344798/1993 and Japanese Patent Application Laid-Open Publication No. 344799/1993 described above causes a diode and the collector-emitter circuit of the transistor acting as the boosting switch to be connected in series to a circuit for short circuit of the generating coil when the transistor is turned on, to thereby fail to permit flowing of a short-circuit current through the generating coil unless an output voltage of the AC magneto exceeds a threshold voltage Vt corresponding to a sum of a collector-emitter saturation voltage VCE of the transistor and forward voltage drop VF of the diode which occurs across the diode when a forward current flows through the diode. Thus, the conventional power device exhibits a disadvantage of failing in boosting operation by on-off operation of the transistor when a voltage induced across the generating coil is at a highly low level.

Also, the conventional power device which uses a transistor for the boosting switch and includes the boosting circuit for boosting an output voltage of the AC magneto causes switching loss of the transistor to be relatively increased, to thereby increase generation of heat from the transistor. This results in requiring a large-sized heat sink, leading to large-sizing of the power device.

SUMMARY OF THE INVENTION

The present invention has been made in view of the foregoing disadvantage of the prior art.

Accordingly, it is an object of the present invention to provide a power device for an internal combustion engine which is capable of operating a boosting circuit for initiating boosting of an output voltage of an AC magneto during quite low speed operation of the internal combustion engine, to thereby satisfactorily drive a load over a wide range between the quite low speed operation of the engine and high-speed operation thereof while acting the AC magneto as a power supply.

It is another object of the present invention to provide a power device for an internal combustion engine which is capable of reducing loss in a boosting circuit for boosting an output voltage of an AC magneto, to thereby minimize generation of heat from the boosting circuit.

In accordance with the present invention, a power device for an internal combustion engine is provided. The power device includes an AC magneto including n (n: an integer of 2 or more) output terminals and driven by the internal combustion engine to generate a single-phase or polyphase AC output from the n output terminals and m (m: an integer between 2 and n) MOSFETs arranged in such a manner that drains and sources thereof are respectively arranged on identical sides, ones of the drains and sources are connected together and the others of the drains and sources are respectively connected to m output terminals of the AC magneto. The m MOSFETs each include a drain-source circuit having a parasitic diode therein. The power device also includes 2n−m rectification diodes arranged so as to cooperate with the parasitic diodes to constitute a diode bridge full-wave rectification circuit for rectifying the AC output of the magneto and an FET control circuit for feeding each of gates of the m MOSFETs with a drive signal to accomplish flowing of a short-circuit current through the MOSFETs by carrying out short circuit between each two of the m output terminals of. the magneto and interruption of the flowing of the short-circuit current plural times during a period of a half cycle of the AC output obtained from the m output terminals.

The words "drive signal" of the MOSFET used herein indicate a signal applied to a gate-source circuit of the MOSFET for on-off operation of the MOSFET and having an on-level and an off-level. The on-level of the drive signal indicates a level of a voltage applied to the gate-source circuit of the MOSFET in order to render the MOSFET turned on and the off-level of the drive signal indicates a level of a voltage applied to the gate-source circuit of the MOSFET in order to render the MOSFET turned off.

The FET control circuit may comprise a circuit for feeding the gate of each of the m MOSFETs with a drive signal of a rectangular waveform having an identical phase and a frequency higher than a frequency of the output of the magneto to concurrently subject the m MOSFETs to on-off operation.

The above-described construction of the present invention permits a short-circuit current to be flowed through the generating coil of the AC magneto when the m MOSFETs are rendered turned on and flowing of the short-circuit current through the generating coil to be interrupted when the m MOSFETs are rendered turned off. Such interruption of the short-circuit current causes a high voltage in a direction of continuing flowing of the short-circuit current to be induced across the generating coil. The voltage thus induced is then rectified by the full-wave rectification circuit constituted by cooperation between the rectification diode and the parasitic diode arranged in the drain-source circuit of each of the MOSFETs, followed by feeding to the load.

The MOSFET of which the gate-source circuit is fed with the drive signal has characteristics of permitting flowing of a drain current concurrently with application of a voltage to the source-drain circuit, wherein when the source-drain voltage is within a predetermined range, flowing of the drain current is carried out substantially in proportion to the source-drain voltage. Thus, the MOSFET which is fed with the drive signal exhibits a function like a resistor, so that a resistance of the source-drain circuit of the MOSFET kept turned on is rendered substantially constant in a region in which the source-drain voltage and drain current are proportional to each other. This results in a circuit including the MOSFET wherein the drive signal is fed across the generating coil being equivalent to a circuit wherein a resistor is connected across the generating coil. Therefore, a threshold voltage required for rendering the MOSFET turned on is substantially zero, so that even slight induction of a voltage across the generating coil of the AC magneto permits a short-circuit current to be flowed from the generating coil through the MOSFET.

As described above, the present invention permits a short-circuit current to be flowed from the generating coil of the AC magneto through the MOSFET even when a voltage induced across the generating coil is highly low, so that a boosted voltage may be induced across the generating coil by on-off operation of the MOSFET even when an engine rotation speed is highly decreased as in manual starting of the engine and therefore an output voltage of the AC magnet is highly reduced. Thus, even when it is required to manually start an internal combustion engine which uses an injector and a fuel injection pump because of excessive discharge of a battery in the engine or it is required to drive the injector or pump by means of only an output of the AC magneto without any battery, the engine can be smoothly activated or started.

In the present invention, the FET control circuit may comprise a circuit constructed in such a manner that MOSFETs wherein a backward voltage is applied to the parasitic diode in the drain-source circuit thereof each are fed at the gate-source circuit thereof with a drive signal of a rectangular waveform which is varied at a frequency higher than a frequency of the output of the magneto between an on-level which renders the MOSFET turned on and an off-level which renders it turned off and MOSFETs wherein a forward voltage is applied to the parasitic diode each are fed at the gate-source circuit thereof with a drive signal which keeps the MOSFET at an on-level during a period of time for which the forward voltage is applied to the parasitic diode.

Such construction wherein the drive signal fed to the MOSFET in which a forward voltage is applied to the parasitic diode is kept at the on-level reduces channel loss due to a drain current of the MOSFET, to thereby reduce generation of heat from the MOSFETs constituting the switch circuit.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein;

FIG. 1 is a circuit diagram showing an embodiment of a power device for an internal combustion engine according to the present invention;

FIG. 2 is a group of waveform diagrams each showing a signal waveform obtained at each of sections of the power device shown in FIG. 1;

FIG. 3 is a waveform diagram showing an example of a waveform of a non-load output voltage of an AC magneto;

FIG. 4 is a group of waveform diagrams each showing a waveform obtained when an FET and a bipolar transistor each are used as a switching element for short-circuiting a generating coil in the power device of FIG. 1;

FIG. 7 is a diagrammatic view showing drain-source-resistance to drain-current characteristics of a MOSFET in the power device of FIG. 1 when the MOSFET is turned on;

FIG. 18 is a circuit diagram showing yet another embodiment of a power device for an internal combustion engine according to the present invention which is intended to reduce channel loss of a MOSFET;

FIG. 19 is a group of waveform diagrams showing a voltage, a current and channel loss at sections of the power device shown in FIG. 18, respectively;

FIG. 21 is a group of waveform diagrams each showing a waveform at each of sections of the power device shown in FIG. 20, respectively;

FIG. 24 is a circuit diagram showing a yet further embodiment of a power device for an internal combustion engine according to the present invention which is intended to reduce channel loss of a MOSFET;

FIG. 25 is a group of waveform diagrams each showing a waveform at each of sections of the power device shown in FIG. 24;

DETAILED DESCRIPTION OF THE PREFERRED EMBODIMENTS

Figure 5A:
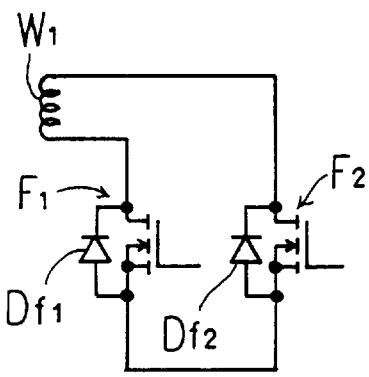
FIG. 5A is a circuit diagram showing a short circuit for a generating coil in the power device of FIG. 1.

Now, a power device for an internal combustion engine according to the present invention will be described hereinafter with reference to the accompanying drawings.

Referring first to FIG. 1, an embodiment of a power device for an internal combustion engine according to the present invention is illustrated embodiment, which is so constructed that an AC magneto generates a single-phase AC output. In a power device of the illustrated embodiment, reference numeral 1 designates an AC magneto including a magnet rotor mounted on a crank shaft of an internal combustion engine and a stator fixed on a casing of the engine or the like. The stator of the AC magneto 1 is provided thereon with a generating coil W1, across which an AC voltage Ve is induced in synchronism with operation or rotation of the engine. In the illustrated embodiment, the generating coil W1 is constructed so as to be decreased in both the number of windings and impedance, resulting in generating an increased current during high-speed operation of the engine as well.

Reference numeral 2 designates a boosting and rectifying circuit for boosting and rectifying an AC voltage induced across the generating coil W1. The boosting and rectifying circuit 2 includes first and second diodes D1 and D2 for rectification of which cathodes are connected to each other or together, as well as first and second MOSFETs F1 and F2 having drains respectively connected to anodes of the first and second diodes D1 and D2 and sources connected to each other or together and each adapted to act as a boosting switch. In the boosting and rectifying circuit 2 thus constructed, a common connection of the cathodes of the diodes D1 and D2 and that of the sources of the MOSFETs F1 and F2 serve as a DC output terminal 2a on a positive side and a DC output terminal 2b on a negative side, respectively. The output terminals 2a and 2b are connected to load connection terminals 4a and 4b of the power device to which a load RL is connected, respectively. The load RL may be, for example, a motor (pump motor) for driving a fuel pump which is adapted to feed an injector of an electronic fuel injection unit with fuel, a CPU for controlling the electronic fuel injection unit, or the like.

Also, the power device of the illustrated embodiment is so constructed that a connection between the anode of the first diode D1 and the drain of the first MOSFET F1 and that between the anode of the second diode D2 and the drain of the second MOSFET F2 act as AC input terminals 2u and 2V, respectively, which are then connected to output terminals 1a and 1b of the generating coil W1, respectively.

The MOSFETs F1 and F2 each may comprise a power MOSFET of the N channel type which includes a parasitic diode Df1 (Df2) connected between the drain of the MOSFET and the source thereof or to a drain-source circuit of the MOSFET. The parasitic diodes Df1 and Df2 respectively incorporated in the MOSFETs F1 and F2 cooperate the first and second diodes D1 and D2 to provide a single-phase diode bridge full-wave rectification circuit. In the illustrated embodiment, the MOSFETs F1 and F2 cooperate with each other to provide a boosting switch circuit for carrying out on-off operation between the output terminals 1a and 1b of the AC magneto 1.

Between the DC output terminals 2a and 2b of the boosting and rectifying circuit 2 is connected an FET control circuit 3 for generating a drive signal VGS. The FET control circuit 3 includes output terminals 3a and 3b, wherein the output terminal 3a is connected to the common connection 2b between the gates of the MOSFETs F1 and F2 and the output terminal 3b is connected to the common connection 2b between the sources of the MOSFETs F1 and F2. The common connection 2b, as described above acts as the DC output terminal on the negative side. The FET control circuit 3 may comprise, for example, an oscillator which carries out oscillation to generate such a signal of a rectangular waveform as shown in (A) of FIG. 2 when a DC power voltage is applied thereto, so that the rectangular waveform signal generated from the control circuit 3 is applied in the form of a drive signal VGS to a gate-source circuit of each of the first and second MOSFETs F1 and F2. Also, in the illustrated embodiment, a capacitor Co is connected between the DC output terminals 2a and 2b of the boosting and rectifying circuit 2 for the purpose of absorbing surge which occurs in the generating coil W1 when the MOSFETs F1 and F2 are turned off and smoothing an output voltage of the boosting and rectifying circuit 2.

In the illustrated embodiment, the FET control circuit 3 is adapted to generate a rectangular waveform of a frequency higher than a frequency of an output of the generating coil W1, resulting in the rectangular waveform signal being fed in the form of a drive signal VGS of an identical phase to the gate-source circuit of each of the MOSFETs F1 and F2 to simultaneously drive both MOSFETs. When a drive signal VGS of a polarity which permits the gate of each of the MOSFETs F1 and F2 to have a potential positive relatively to the source thereof is applied to the gate-source circuit of the MOSFET, both MOSFETs F1 and F2 are rendered turned on; so that even slight application of a voltage of a polarity which permits the drain of each of the MOSFETs to have a potential positive relatively to the source thereof to the drain-source circuit thereof leads to flowing of a drain current through each of the MOSFETs, resulting in a short-circuit current being fed to the generating coil W1 during a period of time Ton for which the drive signal VGS is fed. When the drive signal VGS reaches a level of zero, the MOSFET F1 and F2 are turned off, so that a short-circuit current fed to the generating coil W1 is interrupted, to thereby cause a voltage Vep ((B) of FIG. 2) which is boosted in a direction of continuing feed of a short-circuit current to the generating coil W1 to be induced across the generating coil W1. Such inducing of the voltage Vep causes a current Ie to flow through the generating coil W1 as shown in (C) of FIG. 2, so that such a load current IL as shown in (E) of FIG. 2 may be allowed to flow to the load RL through the full-wave rectification circuit constituted by the diodes D1 and D2 and parasitic diodes Df1 and Df2. (D) of FIG. 2 shows a waveform of a voltage VL induced across the load RL.

In the power device shown in FIG. 1, both MOSFETs F1 and F2 cooperate with each other to provide a short circuit (boosting switch circuit) for the generating coil W1, as shown in FIG. 5A. The MOSFETs each have bidirectionality, so that construction of only both MOSFETs into the short circuit for the generating coil W1 permits feed of a short-circuit current to be carried out at both positive and negative half-cycles of an output voltage of the generating coil W1. This eliminates a necessity of incorporating a diode for rectification into the short circuit for the generating coil W1.

Figure 5B:
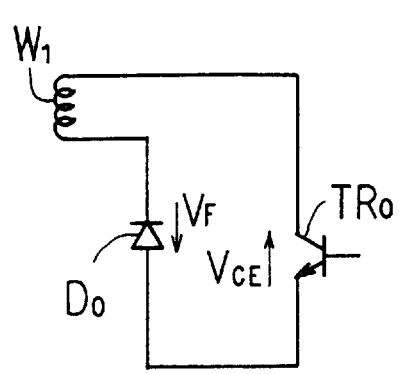
FIG. 5B is a circuit diagram showing a short circuit for a generating coil in a power device in which a transistor is substituted as a boosting switch for a MOSFET.

On the contrary, when the boosting and rectifying circuit is constituted by a full-wave rectification circuit for rectifying a voltage induced across the generating coil W1 and a transistor of which a collector-emitter circuit is connected between each of the output terminals of the generating coil and a negative-side output terminal on a negative polarity side of the full-wave rectification circuit, a circuit for feeding a short-circuit current to the generating coil W1 is constructed as shown in FIG. 5B. More specifically, the circuit includes a series circuit wherein a diode Do and a collector-emitter circuit of a transistor TRo are connected in series.

When the series circuit of the collector-emitter circuit of the transistor TRo and the diode Do is connected across the generating coil W1 as shown in FIG. 5B, a short-circuit current is not permitted to be fed to the generating coil W1 unless an output voltage of the AC magneto exceeds a threshold voltage Vt corresponding to a sum of a saturation voltage across the collector-emitter circuit of the transistor TRo and forward voltage drop Vf. For example, use of a transistor manufactured and sold under a tradename 2SC3710 by Kabushiki Kaisha Toshiba as the transistor TRo in FIG. 5B causes the collector-emitter saturation voltage VCE at 25° C. to be 0.04 (V) or more. Also, use of a diode manufactured and sold under a tradename 20DL2C41A by Kabushiki Kaisha Toshiba as the diode Do causes the forward voltage drop VF at 25° C. to be 0.6 (V) or more. Thus, in this instance, a short-circuit current is not permitted to be fed to the generating coil unless a voltage induced across the generating coil WI exceeds the threshold voltage Vt=VCE+VF=0.64 (V).

Figure 6:
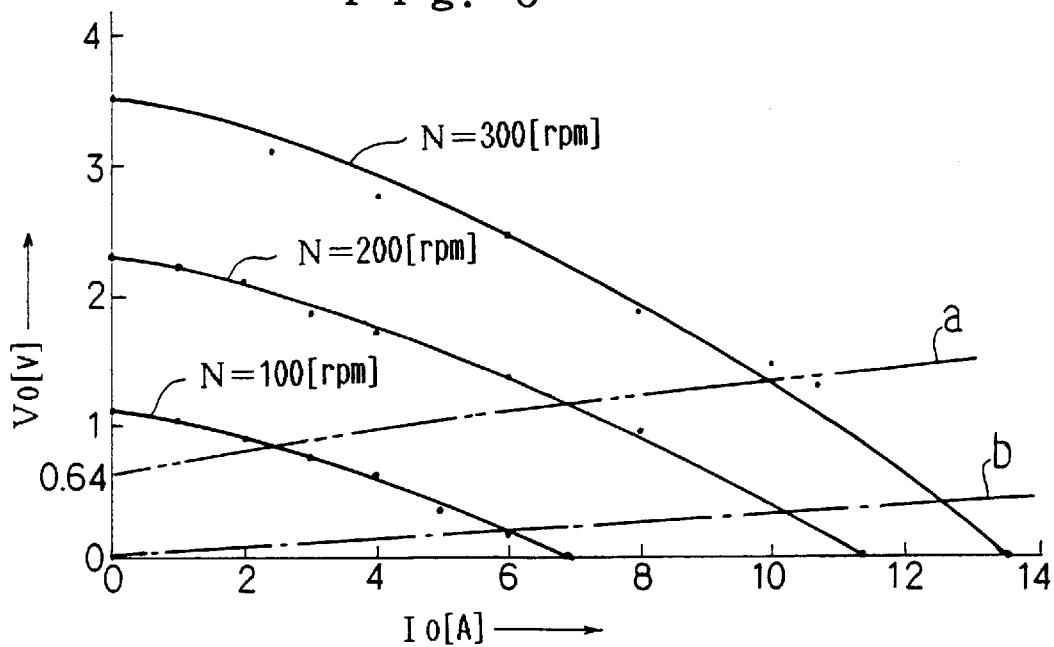
FIG. 6 is a diagrammatic view showing output-voltage to output-current characteristics of an AC magneto, as well as a load line thereof in the power device of FIG. 1.

An example of characteristics of an output current Io to an output voltage Vo in the AC magneto during a quite low engine speed (100 to 300 rpm) is shown in FIG. 6. Use of the AC magneto having such characteristics for such a boosting and rectifying switch circuit as shown in FIG. 5B while using the above-described transistor and diode as the transistor TRo and diode Do in FIG. 5B causes the load connected to the generating coil WI to have such a load line as indicated at a line a in FIG. 6. In this instance, in order to interrupt a short-circuit current fed from the generating coil W1 through the diode Do and transistor TRo to carry out boosting operation, it is required that the AC magneto induces a voltage above the threshold voltage Vt=0.64 (V). When a rotational speed of the internal combustion engine is limited to a low level and an output voltage of the AC magneto is limited to a level below 0.64 (V), a short-circuit current is not permitted to be fed to the generating coil W1.

Figure 7:
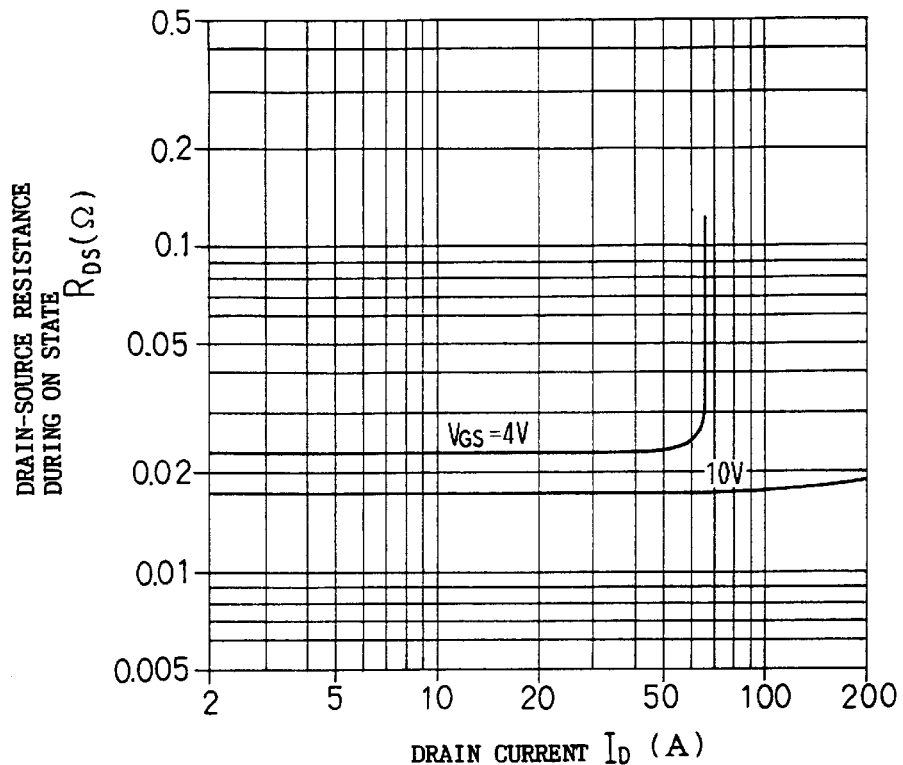
Figure 8:
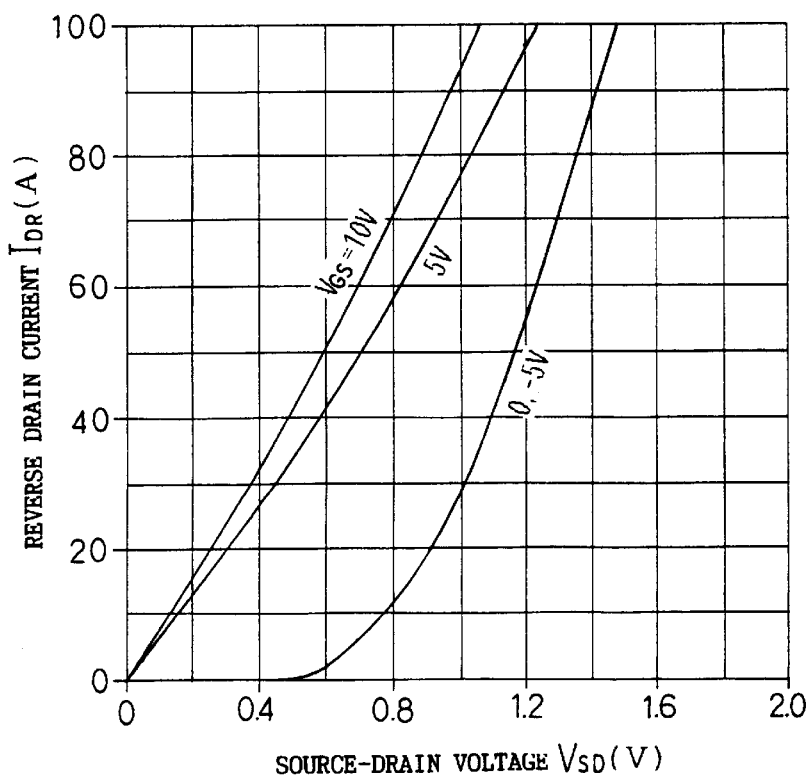
FIG. 8 is a diagrammatic view showing inversion-drain-current to source-drain-voltage characteristics of the MOSFET shown in FIG. 7.

On the contrary, in the present invention, the short circuit for the generating coil W1 is free of any diode as shown in FIG. 5A and the MOSFETs each have bidirectionality, to thereby exhibit a function like a resistor when it is fed with a drive signal, so that even slight application of the voltage VSD across the source-drain circuit of each of the MOSFETs leads to flowing of a drain current the MOSFET. For example, use of a MOSFET manufactured and sold under a tradename 2SK1911 by Kabushiki Kaisha Hitachi as each of the MOSFETs F1 and F2 causes it to exhibit such characteristics of a resistance RDS of the drain-source circuit to the drain current ID as shown in FIG. 7 when it is turned on, as well as such characteristics of an inversion drain current IDR to the source-drain voltage VSD as shown in FIG. 8. In each of FIGS. 7 and 8, reference character VGS designates a drive signal fed to the gate-source circuit of each of the MOSFETs. Thus, it will be noted that when a drive signal VGS of a polarity which permits the source of each of the MOSFETs to have a potential positive relatively to the gate thereof is kept applied to the gate-source circuit of the MOSFET, the drain-source resistance exhibits a constant value over a wide range, resulting in substantially proportional relationship being established between the drain current and the source-drain voltage VSD or each of the MOSFETs being substantially regarded as a resistor.

Thus, the circuit wherein the series circuit (boosting switch circuit) of the two MOSFETs F1 and F2 fed with a drive signal is connected across the generating coil WI is rendered equivalent to a circuit wherein a resistor is connected across the generating coil, so that a load line of the AC magneto obtained under the conditions that both MOSFETs are concurrently fed with a drive signal is as indicated at b in FIG. 6 which passes through the origin (0, 0). Therefore, a threshold voltage required to turn on each of the MOSFETs reaches a level of zero, so that even slight inducing of a voltage across the generating coil W1 of the AC magneto 1 causes a short-circuit current to be fed through both MOSFETs F1 and F2 to the generating coil W1. Thus, even when a rotational speed of the internal combustion engine is reduced to a quite low level as in rope starting of the engine, slight inducing of a voltage across the generating coil turns on the MOSFETs F1 and F2, to thereby permit a short-circuit current to be fed to the generating coil W1, so that a boosted voltage may be induced across the generating coil when the drive signal of each of the MOSFETs F1 and F2 is extinguished to interrupt the short-circuit current.

Now, the following description will be made on the assumption that the AC magneto 1 generates an AC voltage Ve having such a non-load voltage waveform as shown in FIG. 3. (A) of FIG. 4 indicates a waveform of an output voltage of the AC magneto 1 near a zero point (section A in FIG. 3) while enlarging a time axis in FIG. 3 and (B) of FIG. 4 indicates a waveform of a drive signal VGS fed to the gate of each of the MOSFETs. Also, (C) of FIG. 4 is a waveform of a current Ie fed to the generating coil W1. The illustrated embodiment is constructed so as to permit a current Ie to be fed to the generating coil W1 even when the voltage Ve reaches a level near zero. Thus, the illustrated embodiment permits a short-circuit current to be fed to the generating coil W1 even under the conditions that a voltage induced across the generating coil W1 is restrained to a quite low level, resulting in a voltage sufficient to drive a load due to interruption of the short-circuit current being induced across the generating coil W1 even when a rotational speed of the engine is at a quite low level.

On the contrary, when the short circuit for the generating coil WI is constituted by the series circuit of the diode Do and the collector-emitter circuit of the transistor TRo as shown in FIG. 5B, a current Ie' is not permitted to be fed to the generating coil W1 when an output voltage Ve of the AC magneto 1 is below the threshold voltage Vt; so that a period of time which permits a short-circuit current to be fed to the generating coil W1 is reduced, resulting in a DC current which can be fed to a load during a quite low engine speed as in rope starting being decreased in total amount.

Figure 9:
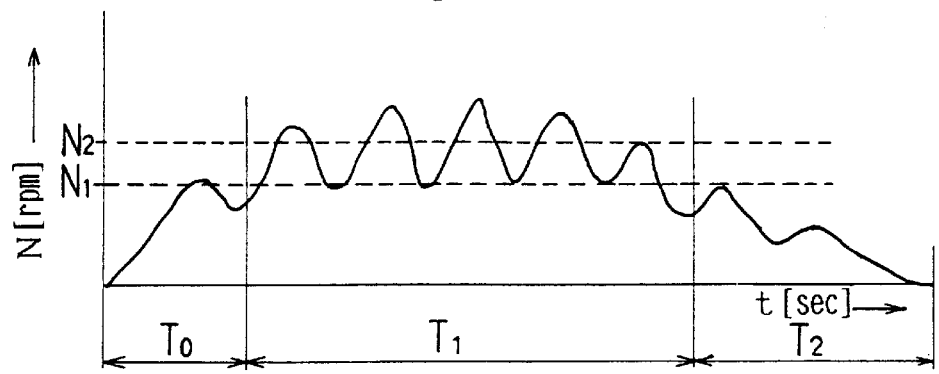
FIG. 9 is a diagrammatic view showing a variation in cranking revolving speed obtained when an internal combustion engine is manually started.

A wave-like line shown in FIG. 9 indicates a variation in cranking rotational speed N of the engine obtained when a rope is drawn for rope starting of the engine. When the power device shown in FIG. 5B is used, the boosting switch circuit merely functions to feed the load with a DC current only during a period T1, so that an average value of the cracking rotational speed in the period T1 is N2. More particularly, in the case that a battery is not arranged, feeding of a power to the load is failed when drawing of the rope fails to permit an average value of the cranking rotational speed to be N2. On the contrary, the illustrated embodiment permits a power to be fed to the load over all of periods T0, T1 and T2, so that an average value of the cranking rotational speed (or an average rotational speed for the periods T0 to T2) required for feeding the load with a power may be reduced to N1 ( N2), to thereby facilitate starting of the engine.

In the illustrated embodiment, it is essential to concurrently subject the MOSFETs F1 and F2 to on-off operation. A delay in driving of one of the MOSFETs causes forward voltage drop of the parasitic diode arranged in the drain-source circuit of the MOSFET delayed to be a threshold voltage of the short circuit, so that it fails to exhibit such advantages as described above.

Also, when a MOSFET which is a voltage control element is used as the boosting switch element which carries out shortcircuit and interruption of the generating coil as described above, it is possible to reduce loss occurring in the boosting switch element during short-circuit of the generating coil, so that generation of heat from the power device may be reduced to a degree sufficient to significantly decrease a size of a heat dissipation plate mounted on the switch element.

Figure 10:
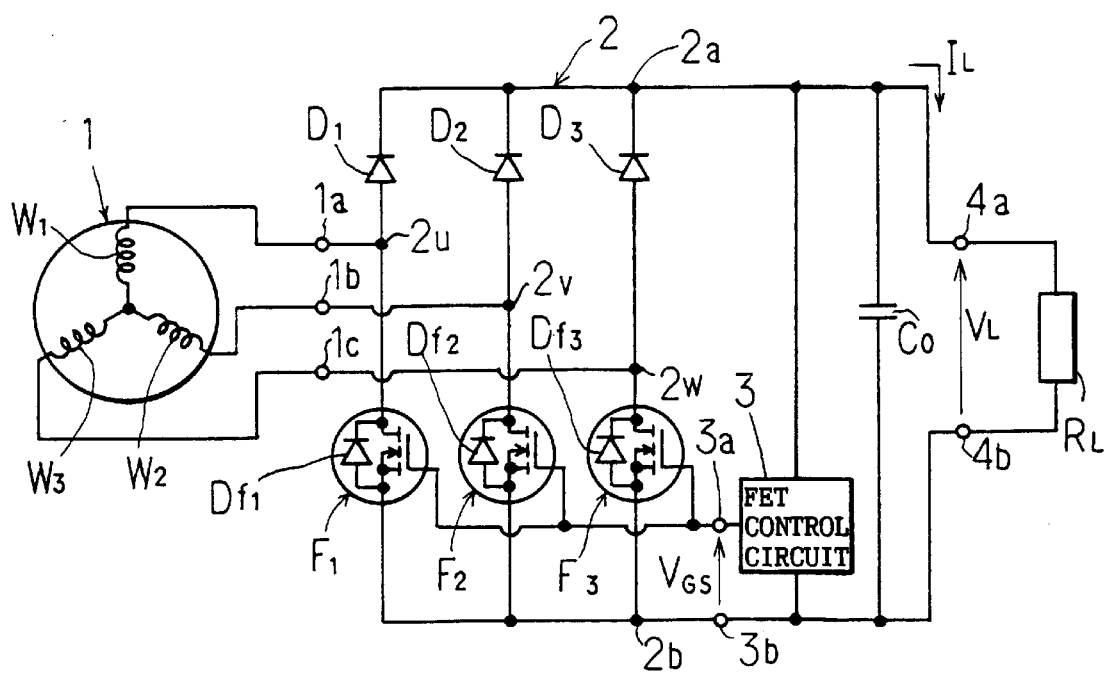
FIG. 10 is a circuit diagram showing another embodiment of a power device for an internal combustion engine according to the present invention.

Referring now to FIG. 10, another embodiment of a power device for an internal combustion engine according to the present invention is illustrated, which is so constructed that an AC magneto generates a three-phase AC output. In the illustrated embodiment, an AC magneto generally designated at reference numeral 1 includes a stator having three-phase generating coils W1 to W3, which are subject to star connection. Likewise, the generating coils W1 to W3 are reduced in the number of windings, resulting in being substantially decreased in impedance. A boosting and rectifying circuit 2 includes first to third diodes D1 to D3 of which cathodes are connected to each other or together and first to third MOSFETs F1 to F3 of which drains are respectively connected to anodes of the first to third diodes D1 to D3 and sources are connected to each other or together, wherein a common connection of the cathodes of the first to third diodes D1 to D3 and a common connection of the sources of the first to third MOSFETs F1 to F3 constitute a positive-side DC output terminal 2a and a negative-side DC output terminal 2b of the circuit 2, respectively. Also, connections 2u, 2v and 2w between the anodes of the first to third diodes D1 to D3 and drains of the first to third MOSFETs F1 to F3 each constitute an AC input terminal of the circuit 2. The AC input terminals 2u, 2v and 2w are connected to output terminals 1a, 1b and 1c of the AC magneto arranged on a side opposite to neutral points of the generating coils W1, W2 and W3. In the illustrated embodiment, MOSFETs F1 to F3 cooperate with each other to provide a boosting switch circuit which carries out on-off operation among the output terminals 1a, 1b and 1c of the magneto.

Reference numeral 3 designates an FET control circuit 3 connected between the output terminals 2a and 2b of the boosting and rectifying circuit 2. The FET control circuit 3 functions to feed each of the gates of the first to third MOSFETs F1 to F3 with a drive signal of a rectangular waveform having an identical phase, to thereby concurrently subject the first to third MOSFETs F1 to F3 to on-off operation. The FET control circuit 3 includes output terminals 3a and 3b to which the gates and sources of the MOSFETs F1 to F3 are commonly connected, respectively. The MOSFETs F1 to F3 each may comprise a MOSFET of the N-channel type having a parasitic diode in a drain-source circuit thereof as in the embodiment described above with reference to FIG. 1. Thus, the first to third diodes D1 to D3 and parasitic diodes Df1 to Df3 of the third to third MOSFETs F1 to F3 cooperate with each other to provide a three-phase diode bridge full-wave rectification circuit.

The remaining part of the illustrated embodiment may be constructed in substantially the same manner as the above-described embodiment.

Figure 11A:
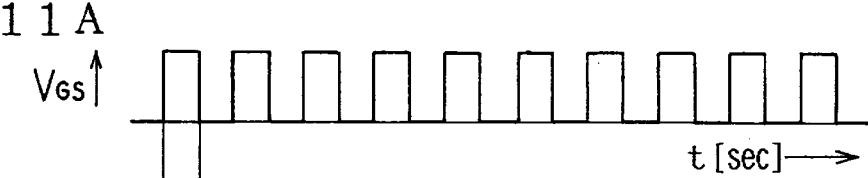
FIG. 11 is a group of waveform diagrams each showing a signal waveform at each of sections of the power device shown in FIG. 10.
Figure 11B:
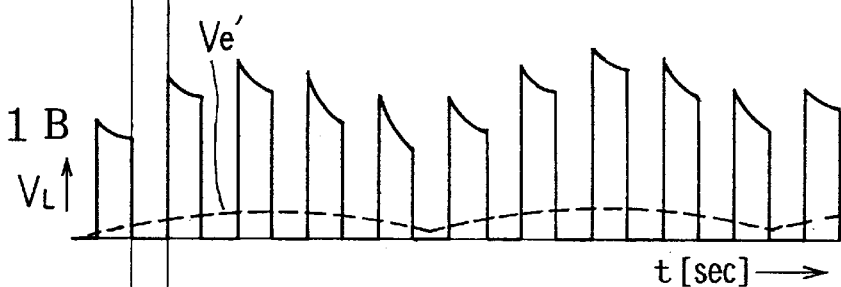
Figure 11C:
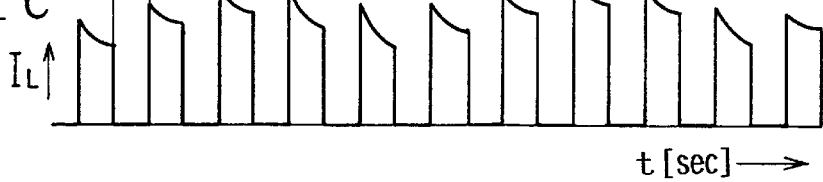

In the embodiment shown in FIG. 10, the first to third MOSFETs F1 to F3 are simultaneously driven by a drive signal VGS of such a rectangular waveform as shown in (A) of FIG. 11. This causes short-circuit and interruption of the generating coils W1 to W3 to be repeated, so that a boosted voltage may be induced across each of the generating coils W1 to W3 when the MOSFETs F1 to F3 are turned off. The voltage thus induced is applied to a load through the full-wave rectification circuit constituted by the rectifying diodes D1 to D3 and parasitic diodes Df1 to Df3. (B) of FIG. 11 indicates a waveform of a voltage VL applied to a load RL and (C) of FIG. 11 indicates a waveform of a current IL fed to the load RL.

In each of the embodiments described above, an oscillation frequency of the FET control circuit 3 and a duty ratio of an output signal thereof may be kept constant. Alternatively, the embodiments each may be constructed so as to prevent an output voltage of the AC magneto from being excessively increased during high-speed operation of the internal combustion engine. For this purpose, a duty ratio of a drive signal generated from the FET control circuit 3 and/or a frequency of the drive signal may be controlled depending on the output voltage so as to restrict the output voltage below a set level. The duty ratio indicates a ratio of a signal width of the drive signal to a cycle of generation of the drive signal. Also, when the output voltage is excessively increased irrespective of the drive signal being rendered zero during a high-speed operation of the engine.

In each of the embodiments described above, the FET control circuit 3 is driven by a rectified output of the generator 1. Alternatively, when a battery is mounted on a vehicle or the like which is driven by the internal combustion engine, the control circuit 3 may be driven by the battery. When it is not mounted thereon, the FET control circuit 3 may be driven by means of a readily available battery such as a dry cell or the like.

In the embodiment shown in FIG. 10, as described above, the boosting and rectifying circuit for boosting and rectifying a three-phase AC voltage is constituted by the three MOSFETs, to thereby provide the switch circuit for carrying out switching operation between each two of the three output terminals of the AC magneto. Alternatively, the switch circuit may be constructed so as to carry out switching operation with respect to a part of the output terminals of the AC magneto.

Figure 12:
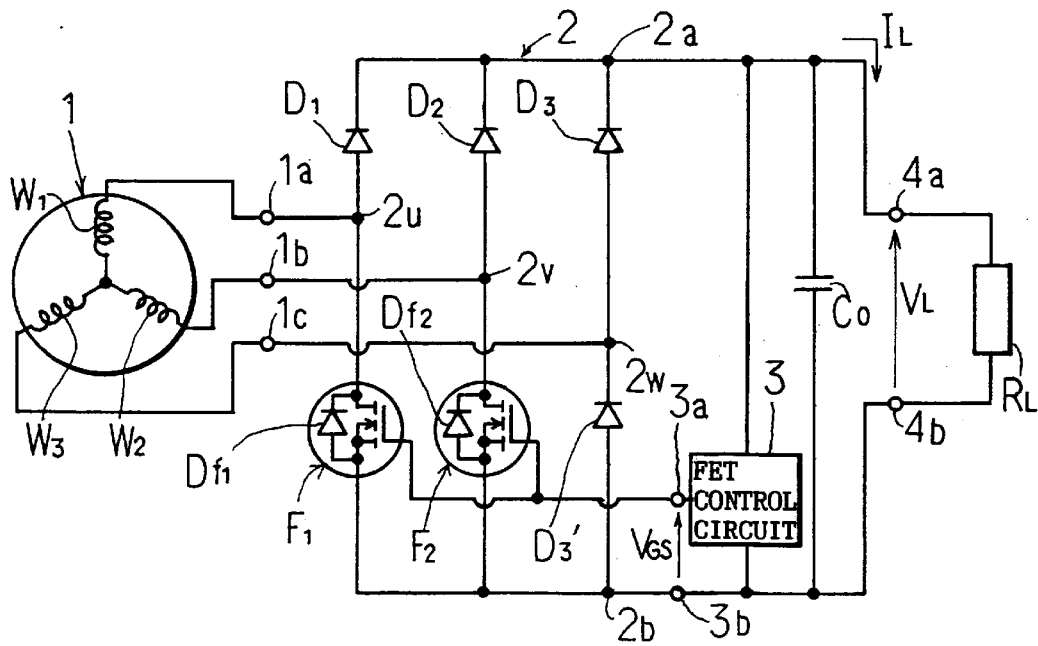
FIG. 12 is a circuit diagram showing a further embodiment of a power device for an internal combustion engine according to the present invention.

Such switching may be accomplished by a further embodiment of a power device for an internal combustion engine according to the present invention which is constructed in such a manner as shown in FIG. 12. In the embodiment of FIG. 12, a boosting and rectifying circuit 2 is constituted by first and second MOSFETs F1 and F2 and four rectification diodes D1 to D3 and D3'. The boosting and rectifying circuit 2 is constructed in substantially the same manner as that in the embodiment of FIG. 10, except that the diode D3' is substituted for the MOSFET F3.

The construction of the embodiment shown in FIG. 12 permits on-off operation of the MOSFETs F1 and F2 to selectively interrupt only a current flowing through generating coils W1 and W2 which constitute a part of generating coils of the AC magneto, resulting in an output voltage of the AC magneto having an asymmetric waveform. However, the output voltage is rectified by the rectifying circuit and then smoothed by a capacitor Co, followed by feeding to a load RL, resulting in being prevented from adversely affecting driving of the load.

In the embodiments described above, the sources of the MOSFETs are connected together and the drains thereof are respectively connected to the anodes of the corresponding rectification diodes, to thereby position the MOSFETs on a side of the negative DC output terminal 2b, resulting in providing the boosting and rectifying circuit. In this instance, it is merely required that arrangement or connection of the parasitic diode in or to the drain-source circuit of each of the MOSFETs is carried out in the same direction as the rectification diode, therefore, the connection is not limited to any specific manner.

Figure 13:
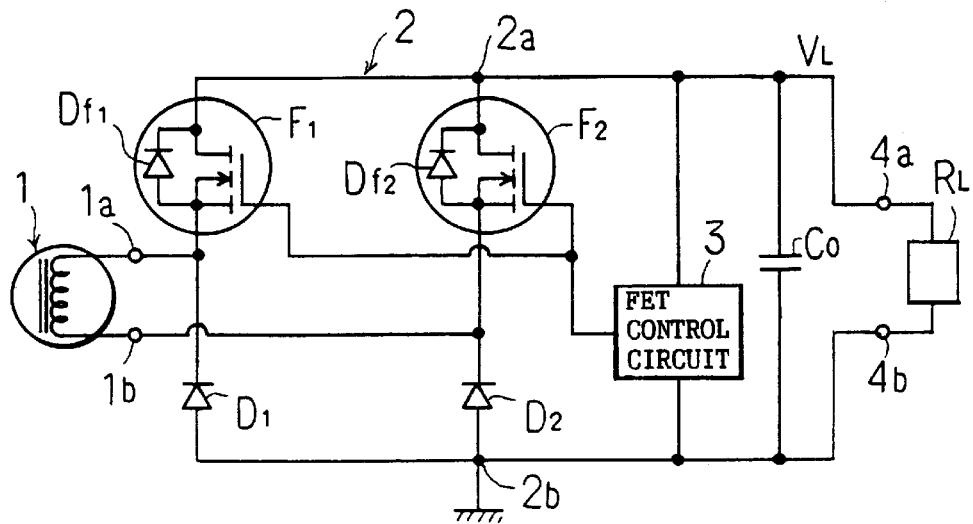
FIG. 13 is a circuit diagram showing still another embodiment of a power device for an internal combustion engine according to the present invention.
Figure 14:
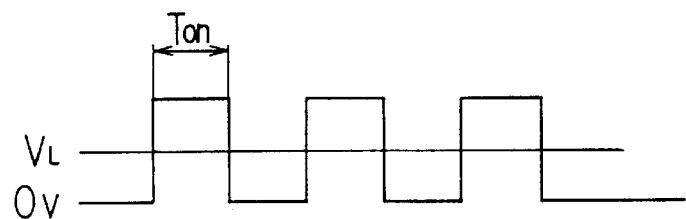
FIG. 14 is a waveform diagram showing a drive signal of a MOSFET used in the power device of FIG. 13.

The connection may be carried out in such a manner as shown in, for example, FIG. 13, which shows still another embodiment of a power device for an internal combustion engine according to the present invention. In the embodiment of FIG. 13, drains of first and second MOSFETs F1 and F2 are connected to each other or together and sources thereof are respectively connected to cathodes of diodes D1 and D2 of which anodes are connected to each other or together, so that the two MOSFETs are positioned on a side of a positive DC output terminal 2a. In this instance, in order to render the MOSFETs F1 and F2 turned on, it is required to render a gate voltage higher than a potential VL across the drains of the MOSFETs, as shown in FIG. 14.

The embodiment of FIG. 13 is so constructed that a boosting and rectifying circuit 2 rectifies a single-phase AC output. Also when the boosting and rectifying circuit 2 is constructed so as to rectify a three-phase AC output, the MOSFETs may be likewise positioned on the side of the DC output terminal. More specifically, the illustrated embodiment may be so constructed that a third MOSFET F3 and first to third rectification diodes D1 to D3 as well as the first and second MOSFETs F1 and F2 are arranged, wherein drains of the first to third MOSFETs are commonly connected to the positive DC output terminal 2a of the boosting and rectifying circuit 2 and anodes of the first to third MOSFETs F1 to F3 are respectively connected to cathodes of the first to third rectification diodes D1 to D3 of which anodes are commonly connected to a negative DC output terminal 2b of the circuit 2.

Further, when a switch circuit for carrying out on-off operation with respect to a part of output terminals of a polyphase AC magneto by means of MOSFETs less than the number of output terminals of the magneto is constructed as in FIG. 12, the MOSFETs may be likewise arranged on the side of the positive DC output terminal 2a of the boosting and rectifying circuit 2.

In general, when a boosting and rectifying circuit for boosting and rectifying an output of an AC magneto which includes n (n: an integer of 2 or more) output terminals and is adapted to generate a single-phase or polyphase AC voltage is to be provided, a boosting switch circuit may be constructed in such a manner to carry out short circuit between at least two output terminals of the AC magneto. In order to construct a boosting switch circuit for carrying out short circuit between two generating coil of the AC magneto, two MOSFETs are required as shown in FIG. 5A. Thus, the boosting and rectifying circuit adapted to boost and rectify an AC output voltage of the AC magneto while positioning the MOSFETs of the N channel type on the side of the negative DC output terminal includes m (m: an integer of 2 and n) MOSFETs of which sources are connected together and drains are respectively connected to different output terminals of the AC magneto and 2n-m rectification diodes, wherein the 2n-m rectification diodes and the m MOSFETs are subject to bridge connection so that parasitic diodes in a drain-source circuit of each of the m MOSFETs and the 2n-m rectification diodes cooperate with each other to constitute a diode bridge full-wave rectification circuit for subjecting the polyphase AC voltage to full-wave rectification. In this instance, the FET control circuit may comprise a circuit for feeding a gate of each of the m MOSFETs with a drive signal of a rectangular waveform having an identical phase to concurrently subject the m MOSFETs to on-off operation.

Also, the boosting and rectifying circuit adapted to boost and rectify a single-phase or polyphase AC output voltage of the AC magneto including the output terminals of n in number while positioning the MOSFETs of the N channel type on the side of the positive DC output terminal includes m (m: an integer 2 and n) MOSFETs of which drains are connected together and sources are respectively connected to different output terminals of the magneto and 2n-m rectification diodes, wherein the 2n-m rectification diodes and m MOSFETs are subject to bridge connection so that parasitic diodes in a drain-source circuit of each of the m MOSFETs and the 2n-m rectification diodes cooperate with each other to constitute a diode bridge full-wave rectification circuit for subjecting the polyphase AC output voltage to full-wave rectification.

In each of the embodiments described above, the MOSFETs each are constructed into the N channel type which is rendered turned off when a potential at a gate of the MOSFET relative to a source thereof is 0 volt and rendered turned on when it is fed with a drive signal for rendering a potential at the gate positive relatively to that at the source. Alternatively, each of the MOSFETs may be constructed into the P channel type which is rendered turned on when a gate potential is 0 volt and rendered turned off when it is fed with a drive signal for rendering a potential at the gate positive relatively to that at the source.

Figure 15:
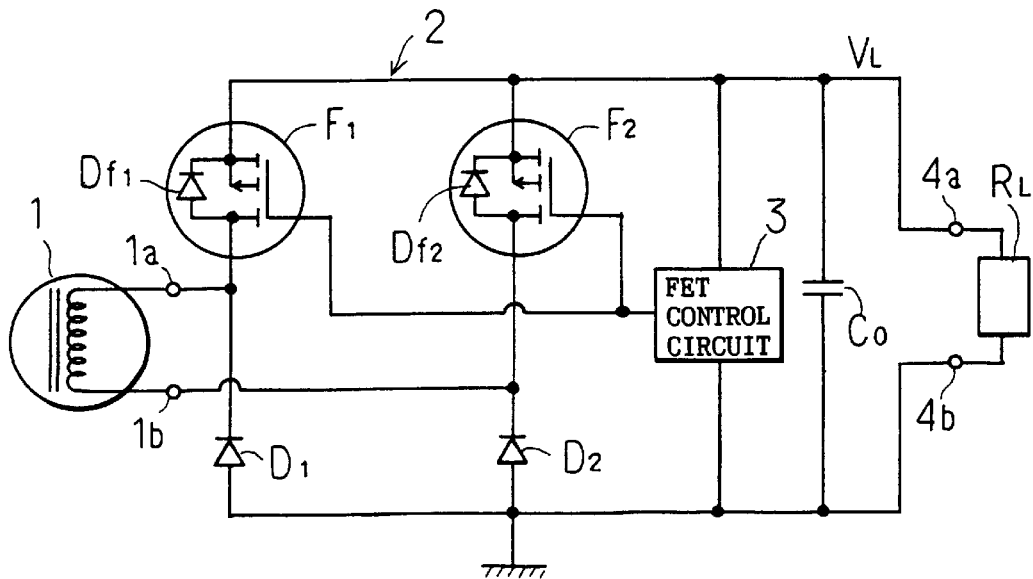
FIG. 15 is a circuit diagram showing a still further embodiment of a power device for an internal combustion engine according to the present invention.

Referring now to FIG. 15, yet another embodiment of a power device for an internal combustion engine according to the present invention is illustrated, which employs MOSFETs of the P channel type. A power device of the illustrated embodiment is constructed in such a manner that first and second MOSFETs F1 and F2 have sources connected together and first and second rectification diodes D1 and D2 have anodes connected together, wherein drains of the MOSFETs F1 and F2 are connected to cathodes of the diodes D1 and D2, respectively. The MOSFETs F1 and F2 include parasitic diodes, respectively, which cooperate with the rectification diodes D1 and D2 to provide a single-phase diode bridge full-wave rectification circuit.

Figure 16:
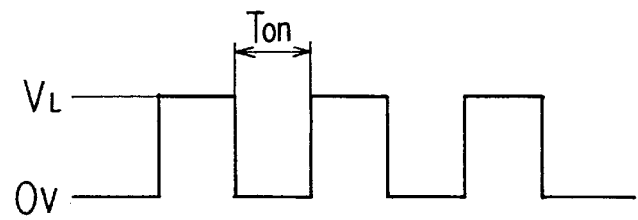
FIG. 16 is a waveform diagram showing a drive signal of a MOSFET used in the power device of FIG. 15.
Figure 17A:
FIG. 17 is a group of waveform diagrams showing a voltage, a current and channel loss at sections of the power device shown in FIG. 15, respectively.
Figure 17B:
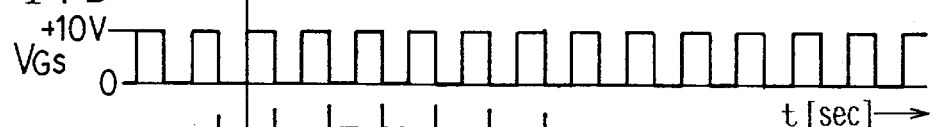
Figure 17C:
Figure 17D:
Figure 17E:

In the illustrated embodiment, in order to render the MOSFETs F1 and F2 turned on, it is required to increase a gate potential of each of the MOSFETs to a level equal to or higher than a potential VL at a source of each of the MOSFETs F1 and F2 or an output terminal on a positive side of a boosting and rectifying circuit 2, as shown in FIG. 16. A source of each of the MOSFETs indicates a positive-side output terminal of a rectification circuit.

Also in the illustrated embodiment, the boosting and rectifying circuit 2 for boosting and rectifying a three-phase AC output of an AC magneto may be constructed of first to third rectification diodes D1 to D3 of which anode are connected together and first to third MOSFETs F1 to F3 of the P channel type of which drains are respectively connected to cathodes of the first to third rectification diodes D1 to D3 and sources are connected together.

Also when such a boosting and rectifying circuit for boosting and rectifying a polyphase AC output of the AC magneto is constructed of MOSFETs of the P channel type, a boosting switch circuit may be constructed of MOSFETs decreased in number less than output terminals of the magneto so as to carry out on-off operation with respect to only a part of the output terminals of the magneto.

In general, a boosting and rectifying circuit adapted to boost and rectify an AC voltage generated from an AC magneto for generating a single-phase or polyphase AC voltage between each two of n (n: an integer of 2 or more) output terminals thereof, to thereby output a DC voltage includes m (m: an integer between 2 and n) MOSFETs of the P channel type of which sources are connected together and drains are respectively connected to different output terminals of the above-described AC magneto and 2n-m rectification diodes, wherein the m MOSFETs and the 2n-m rectification diodes are subject to bridge connection so that parasitic diodes in drain-source circuits of the m MOSFETs and the 2n-m rectification diodes cooperate with each other to provide a diode bridge full-wave rectification circuit.

In the embodiments described above, all the MOSFETs constituting the boosting switch circuit each are fed with a signal of a rectangular waveform having an identical phase, to thereby be simultaneously subjected to on-off operation. Such construction causes relatively increased channel loss to occur in the MOSFETs through which a reverse drain current flows when the drive signal reaches an off-level, to thereby increase generation of heat from the MOSFETs.

In the power device shown in FIG. 1, when a drive signal fed to the MOSFETs F1 and F2 is caused to be at the off-level, to thereby interrupt a short-circuit current fed to the generating coil W1, a voltage induced across the generating coil W1 causes a current to flow through a path extending or circulating from the generating coil W1 through the diode D2 of the boosting and rectifying circuit 2, the FET control circuit 3, a parallel circuit of the capacitor Co and load RL, and the parasitic diode Df1 of the MOSFET F1 to the generating coil W1 or a path extending or circulating from the generating coil W1 through the diode D1 of the boosting and rectifying circuit 2, the FET control circuit 3, the parallel circuit of the capacitor Co and load RL, and the parasitic diode Df2 of the MOSFET F2 to the generating coil W1, so that a reverse drain current or a current which has a polarity defined in a direction from a source side to the drain side thereof may be flowed through the MOSFETs F1 and F2.

On the contrary, in the MOSFET of the N channel type, if the drive signal is at the off-level when a drain-source voltage of the MOSFET or a voltage across the drain-source circuit of the MOSFET has a polarity of causing a forward voltage to be applied to the parasitic diode or when a reverse drain current flows through the MOSFET, channel loss Pch thereof is increased. Thus, when a drive signal of the MOSFET F1 and that of the MOSFET F2 are caused to concurrently have the off-level, channel loss in the switch circuit is increased, resulting in generation of heat from the MOSFETs being increased.

For example, in the MOSFET shown in FIG. 8, supposing that a reverse drain current IDR flowing through the MOSFET under the conditions that the gate-source circuit of the MOSFET is kept fed with an on-level drive signal VGS of 10 (V) is 20(A), a voltage VSD across the source-drain circuit of the MOSFET is 0.27 (V), so that channel loss Pch is as follows:

$$Pch = VSD \times IDR = 0.27 \times 20 = 5.4(W)$$

On the contrary, when a reverse drain current of 20 (A) flows through the MOSFET wherein a drive signal is kept at the off-level (VGS=0), a voltage across the source-drain circuit of the MOSFET is caused to be 0,91 (V), therefore, the channel loss Pch is as follows:

$$Pch = 0.91 \times 20 = 18.2(W)$$

Thus, channel loss due to the reverse drain current when the drive signal is at the off-level is three times or more as much as that when the drive signal is at an on-level.

Operation waveforms obtained in the power device of FIG. 1 from the viewpoint of channel loss of the MOSFET F1 are as shown in (A) to (E) of FIG. 17. In FIG. 17, (A) indicates a voltage induced across the generating coil WI and (B) indicates a drive signal VGS applied to the gate-source circuit of each of the MOSFETs. Also, (C) designates a voltage VDS across the drain-source circuit of the MOSFET F1 and (D) indicates the drain current ID of the MOSFET F1. Further, (E) indicates channel loss Pch of the MOSFET F1.

As seen in (E) of FIG. 17, when the drive signal VGS is at the off-level when a reverse drain current is kept flowing through the MOSFET, the channel loss Pch is highly increased. Such an increase in channel loss leads to an increase in generation of heat from the MOSFET, so that it is required to large-size a heat sink for the MOSFET, resulting in large-sizing of the power device.

The above description has been made in connection with the MOSFET of the N channel by way of example. However, it is true of the MOSFET of the P channel type. Thus, in the MOSFET of the P channel type, if the drive signal is at the off-level when a voltage across the drain-source circuit of the MOSFET has a polarity of causing a forward voltage to be applied to the parasitic diode or when a current flows from the drain of the MOSFET to the source thereof, channel loss Pch is likewise increased. Thus, when the drive signals of a plurality of the MOSFETs of the P channel type constituting the switch circuit are caused to have concurrently the off-level, channel loss in each of the MOSFETs is increased, resulting in generation of heat from the MOSFETs being increased.

In order to solve the problem described above, the FET control circuit may be constructed in such a manner that of a plurality of the MOSFETs constituting the switch circuit, the MOSFETs wherein a backward voltage is applied to the parasitic diode arranged in the drain-source circuit thereof each are fed at the gate-source circuit thereof with a drive signal of a rectangular waveform which is varied at a frequency higher than a frequency of the output of the above-described AC magneto between the on-level which renders the MOSFET turned on and the off-level which renders it turned off. Also, the FET control circuit is so constructed that the MOSFETs wherein a forward voltage is applied to the parasitic diode each are fed at the gate-source circuit thereof with a drive signal which keeps the MOSFET at the on-level during a period of time for which the forward voltage is applied to the parasitic diode.

The on-level of the drive signal indicates a level of a voltage applied to the gate-source circuit of the MOSFET to render it turned on and the off-level of the drive signal indicates a level of a voltage applied to the gate-source circuit of the MOSFET to render it turned off. In the MOSFET of the N channel type, the on-level of the drive signal indicates a level which renders a potential at the drain of the MOSFET positive relatively to the source thereof in a predetermined magnitude and the off-level thereof indicates a level which renders a potential at the drain of the MOSFET zero or slightly negative relatively to the source thereof. In the MOSFET of the P channel type, the on-level of the drive signal indicates a level which decreases a potential at the gate of the MOSFET by a predetermined magnitude Vg (for example, 10 (V)) relatively to a potential at the source thereof and the off-level of the drive signal indicates a level which renders a potential at the gate equal to or slightly higher than a potential at the source.

Also, as described above, when the present invention is so constructed that a drive signal fed to the MOSFET in which a forward voltage is applied to the parasitic diode is held at the on-level, channel loss Pch of the MOSFET due to a drain current of the MOSFET is permitted to be reduced. Thus, such construction reduces generation of heat from the MOSFETs constituting the switch circuit, leading to small-sizing of the heat sink and therefore the power device.

Referring now to FIG. 18, a further embodiment of a power device for an internal combustion engine according to the present invention is illustrated, wherein an FET control circuit is constructed so as to hold, at an on-level, a level of a drive signal fed to a MOSFET in which a forward voltage is applied to a parasitic diode. In FIG. 18, reference numeral 1 designates an AC magneto mounted on an internal combustion engine. 2 is a boosting and rectifying circuit constituted by MOSFETs F1 and F2 of the N channel type of which sources are connected to each other or together and drains are respectively connected to output terminals 1a and 1b of the AC magneto, as well as rectification diodes D1 and D2 of which cathodes are connected together and anodes are respectively connected to the drains of the MOSFETs F1 and F2. 3 is an FET control circuit. The MOSFET includes a gate-source circuit having a resistor Rgs1 connected thereto. Likewise, the MOSFET F2 includes a gate-source circuit having a resistor Rgs2 connected thereto.

The boosting and rectifying circuit 2 includes a DC output terminal 2a on a positive polarity side thereof connected to a load connection terminal 4a on a positive polarity side of the power device and a DC output terminal 2b on a negative polarity side thereof connected to a load connection terminal 4b on a negative polarity side of the power device. Reference character 3A designates a drive signal generating circuit which has power terminals 3a and 3b connected to the DC output terminals 2a and 2b of the boosting and rectifying circuit 2, respectively. The drive signal generating circuit 3A also has an output terminal 3c commonly connected to gates of the MOSFETs F1 and F2 through diodes Da and Db each having an anode arranged so as to face the output terminal 3c, respectively.

Between the output terminal 1b of the generating coil W1 and the gate of the MOSFET F1 is connected a diode Dc having an anode arranged so as to face the output terminal 1b. Also, between the output terminal 1a of the generating coil W1 and the gate of the MOSFET F2 is connected a diode Dd having an anode arranged so as to face the output terminal 1a. In the illustrated embodiment, the drive signal generating circuit 3A and diodes Da to Dd cooperate with each other to provide the FET control circuit 3.

The drive signal generating circuit 3A comprises an oscillator such as a monostable multivibrator or the like which generates a rectangular-waveform signal. Thus, it generates a rectangular-waveform signal Vq of a frequency substantially higher than a frequency of the output of the AC magneto as shown in (B) of FIG. 19.

In the embodiment of FIG. 18, the rectangular-waveform thus generated from the drive signal generating circuit 3A alternately takes an on-level state and an off-level state as shown in (B) of FIG. 19. In the illustrated embodiment, the on-level state and off-level state may be a level of 10(V) and a level of 0 (V), respectively. The rectangular-waveform signal has a frequency set to be substantially higher than a frequency of the output of the AC magneto. The rectangular-waveform signal Vq is fed in the form of drive signals VGS1 and VGS2 through the diodes Da and Db to the gate-source circuits of the MOSFETs F1 and F2, respectively. When the drive signal of the on-level is fed to each of the MOSFETs F1 and F2, the MOSFET to which a drain-source voltage of a positive polarity which causes the drain to have a higher potential than the source is applied is turned on, to thereby cause a drain current to be fed to the MOSFET and a reverse drain current to be fed to the remaining MOSFET, resulting in the generating coil W1 being short-circuited.

For example, during a period of time for which a voltage Ve of a positive half-cycle indicated at a solid line in FIG. 18 is induced across the generating coil W1, a forward drain current is caused to flow through the MOSFET F1 in a direction from the drain to the source during a period for which the drive signal VGS1 is kept at the on-level and a reverse drain current is caused to flow through the MOSFET F2 in a direction from the source to the drain, so that the generating coil W1 is short-circuited. When the drive signal VGS1 is at the off-level under such conditions, the MOSFET F1 takes an off-state, so that flowing of a short-circuit current through the generating coil W1 is interrupted. This results in a voltage boosted being induced across the generating coil W1 in a direction which is to continue flowing of the short-circuit current through the generating coil W1 or in the direction of the solid line in FIG. 18. The voltage thus induced causes a drive signal of the on-level to be fed through the diode Dd to the gate-source circuit of the MOSFET F1. Thus, the voltage induced across the generating coil W1 permits a drive signal of the MOSFET F2 to be held at the on-level when a reverse drain current flows to the MOSFET F2 via a path circulating from the generating coil W1 through the diode D1, a load RL and the MOSFET F2 to the generating coil W1 or when a forward voltage is applied to a parasitic diode Df2 of the MOSFET F2, so that the MOSFET F2 may be decreased in channel loss Pch.

Also, during a period for which a negative half-cycle voltage in a direction indicated at broken lines in FIG. 18 is induced across the generating coil W1, a forward drain current and a reverse drain current are flowed through the MOSFET F2 and F1 during a period for which the drive signal VGS2 is kept at the on-level, respectively, so that the generating coil W1 is short-circuit. When the drive signal is at the off-level under such conditions, the MOSFET F2 takes an off-state to cause flowing of a short-circuit current through the generating coil W1 to be interrupted, so that a voltage boosted may be induced across the generating coil W1 in a direction which is to continue flowing of the short-circuit current through the generating coil W1 or in the direction of the broken lines in FIG. 18. The voltage thus induced causes a drive signal of the on-level to be fed through the diode Dc to the gate-source circuit of the MOSFET F1. Thus, the voltage induced across the generating coil W1 permits a drive signal of the MOSFET F1 to be held at the on-level when a reverse drain current is flowed to the MOSFET F1 via a path circulating from the generating coil W1 through the diode D2, load RL and MOSFET F1 to the generating coil W1 or when a forward voltage is applied to a parasitic diode Df1 of the MOSFET F1, so that the MOSFET F1 may be decreased in channel loss Pch.

In FIG. 19, (C) indicates a waveform of the drive signal VGS1 fed to the gate-source circuit of the MOSFET F1 shown in FIG. 18 and (D) indicates a waveform of the voltage VDS1 of the drain-source circuit of the MOSFET F1. A waveform of a drainsource voltage of the MOSFET F1 during a period of a negative half-cycle of an output of the magneto is forward voltage drop of the parasitic diode Df1 of the MOSFET F1.

In FIG. 19, (E) indicates a drain current IDI of the MOSFET F1 and (F) indicates channel loss Pch of the MOSFET F1. An operation waveform in association with the MOSFET F2 and channel loss thereof are omitted from FIG. 19 for the sake of brevity.

As will be noted from (F) of FIG. 19, the illustrated embodiment is so constructed that a voltage induced across the generating coil W1 when a short-circuit current of the generating coil W1 is interrupted permits a drive signal of the on-level to be fed to the MOSFET in which a forward voltage is applied to the parasitic diode. Such construction prevents an excessive increase in channel loss due to a reverse drain current as encountered in the embodiment shown in FIG. 1, to thereby restrain generation of heat from the MOSFET. Supposing that a MOSFET having such characteristics as shown in FIG. 8 is used and a reverse drain current is set to be 20 (A), the power device of FIG. 18 restricts channel loss due to the reverse drain current to a level one third as high as that in the power device of FIG. 1 or below.

The embodiment shown in FIG. 18, as described above, is so constructed that during a period for which a forward voltage is applied to the parasitic diode of each of the MOSFETs, a drive signal of the on-level is fed from the AC magneto through the diode to the MOSFET. Alternatively, the present invention may be constructed in such a manner that all drive signals are fed from the drive signal generating circuit 3A to the MOSFETs.

Figure 20:
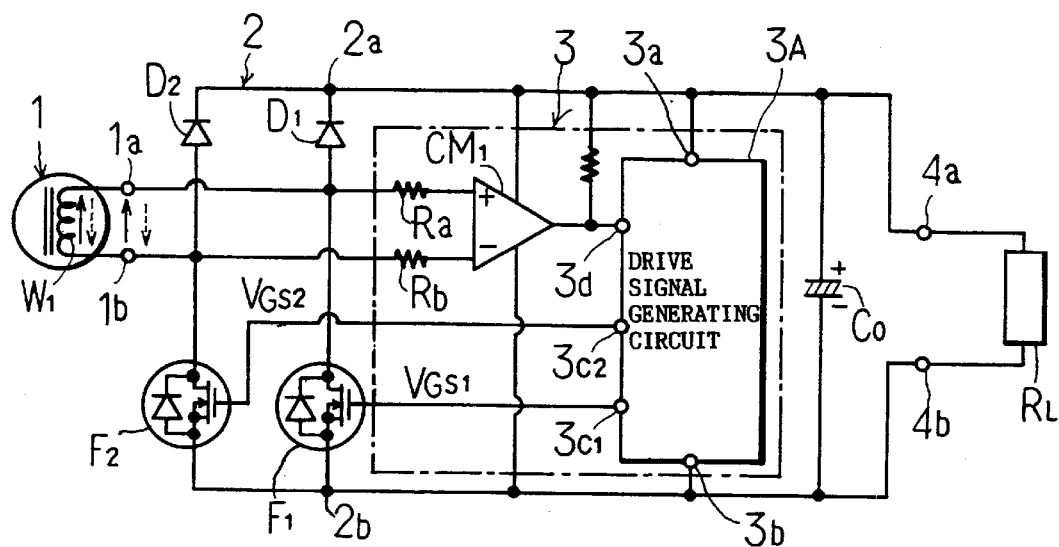
FIG. 20 is a circuit diagram showing even another embodiment of a power device for an internal combustion engine according to the present invention which is intended to reduce channel loss of a MOSFET.

Referring now to FIG. 20, a still further embodiment of a power device for an internal combustion according to the present invention is illustrated, which is adapted to feed all drive signals from a drive signal generating circuit 3A to MOSFETs. In the illustrated embodiment, an AC magneto 1 includes two output terminals 1a and 1b, which are connected through resistors Ra and Rb to a non-inversion input terminal (positive terminal) of a comparator CM1 and an inversion input terminal (negative terminal) thereof, respectively. The comparator CM1 has an output terminal connected through a resistor R1 to a DC output terminal 3a on a positive polarity side of a boosting and rectifying circuit 2 which is a common connection of cathodes of diodes D1 and D2. In the illustrated embodiment, an output voltage of a half-cycle having a polarity in a direction indicated at an arrow of a solid line in FIG. 20 which causes the output terminal 1a of the AC magneto 1 to have a potential positive relatively to the output terminal 1b thereof is defined to be an output voltage of a positive half-cycle. An output voltage Ve of the AC magneto has such a waveform as shown in (A) of FIG. 21.

The comparator CM1 generates such a control signal Vs as shown in (B) of FIG. 21. The control signal Vs is held at a high level during a period for which the AC magneto 1 generates an output voltage of a positive half-cycle in the direction indicated at the solid line arrow in FIG. 20 and at a zero level during a period for which the AC magneto 1 generates an output voltage of a negative half-cycle in a direction indicated at a broken line arrow in FIG. 20.

The drive signal generating circuit 3A includes the above-described power terminal 3a and a power terminal 3b respectively connected to output terminals 2a and 2b of the boosting and rectifying circuit 2, output terminals 3c1 and 3c2 adapted to generate drive signals VGS1 and VGS2, respectively, and a control terminal 3d, wherein a control signal generated from the comparator CM1 is fed to the control terminal 3d. When the control terminal 3d of the drive signal generating circuit 3A is fed with a control signal Vs of a high level, the drive signal generating circuit 3A generates, form the output terminal 3c1 thereof, a drive signal VSG1 of a rectangular waveform ((D) of FIG. 21) which is varied at a frequency higher than a frequency of an output of the magneto between an off-level and an on-level and generates, from the output terminal 3c2 thereof, a drive signal VGS2 ((C) of FIG. 21) held at the on-level. Also, during a period for which a control signal Vs fed to the control terminal 3d is kept at a zero level, a drive signal VSG1 held at the on-level is outputted from the output terminal 3c1 and a drive signal VGS2 of a rectangular waveform which is varied at a frequency higher than a frequency of an output of the AC magneto between the off-level and the on-level is outputted from the output terminal 3c2. The drive signals VGS1 and VGS2 thus outputted are fed to gate-source circuits of MOSFETs F1 and F2, respectively. In the illustrated embodiment, the drive signal generating circuit 3A, the comparator CM1, a resistor R1, and the resistors Ra and Rb cooperate with each other to provide an FET control circuit 3. The remaining part of the illustrated embodiment may be constructed in substantially the same manner as the embodiment of FIG. 1. The illustrated embodiment thus constructed carries out operation in substantially the same manner as the embodiment of FIG. 1.

Figure 22:
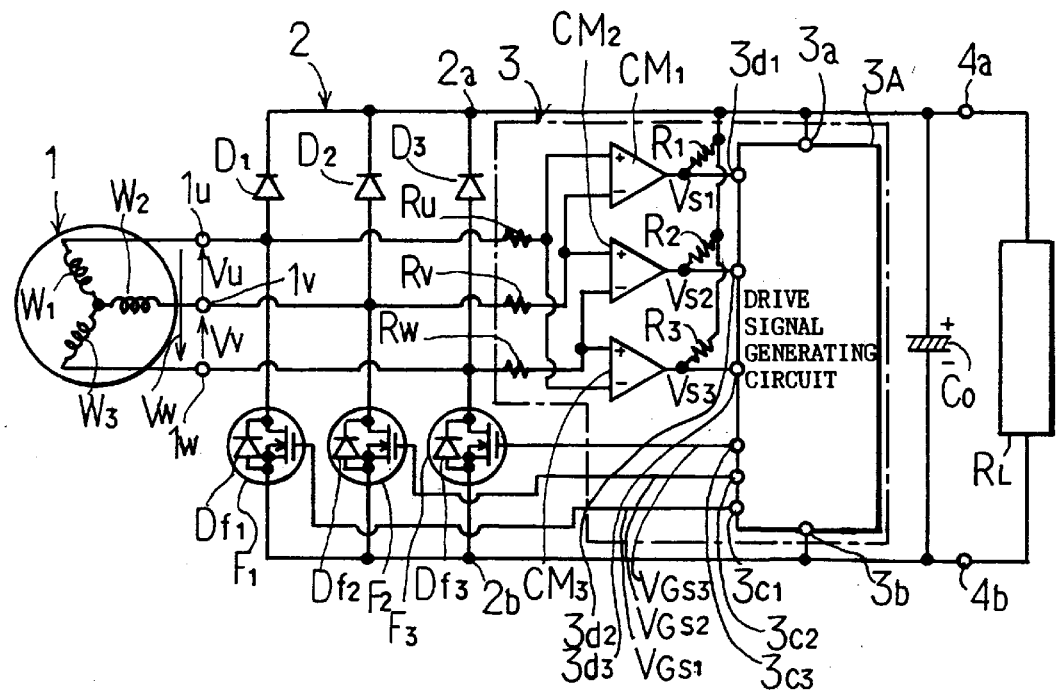
FIG. 22 is a circuit diagram showing a still further embodiment of a power device for an internal combustion engine according to the present invention which is intended to reduce channel loss of a MOSFET.
Figure 23A:
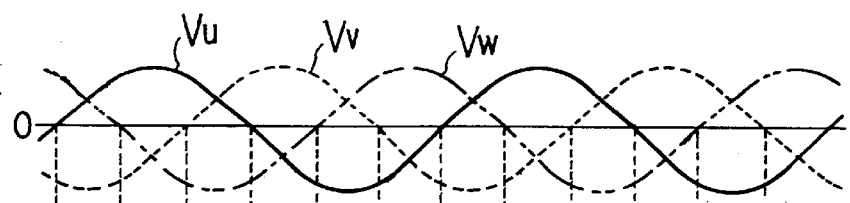
FIG. 23 is a group of waveform diagrams each showing a waveform at each of sections of the power device shown in FIG. 22, respectively.
Figure 23B:
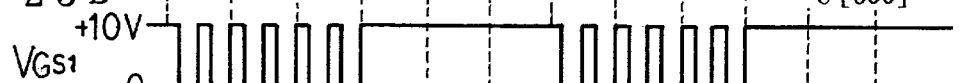
Figure 23C:
Figure 23D:

Referring now to FIG. 22, a yet further embodiment of a power device for an internal combustion according to the present invention is illustrated, which is adapted to permit an AC magneto to generate a three-phase AC output. In the illustrated embodiment, an AC magneto 1 includes three-phase generating coils W1 to W3 subjected to star connection. Also, the AC magneto 1 includes three output terminals 1u to 1w and generates such three-phase AC voltages Vu, Vv and Vw as shown in (A) of FIG. 23 between each two of the output terminals or between the output terminals 1u and 1v, between the output terminals 1v and 1w and between the output terminals 1w and 1v, respectively.

The output terminals 1u to 1w of the AC magneto 1 are respectively connected to drains of MOSFETs F1 to F3 of the N channel type, of which sources are connected together. Also, the output terminals 1u to 1w of the AC magneto 1 are respectively connected to anodes of rectification diodes D1 to D3, of which cathodes are connected together. The MOSFETs F1 to F3 and diodes D1 to D3 thus connected to the AC magneto cooperate with each other to provide a boosting and rectifying circuit 2. The MOSFETs F1 to F3 include parasitic diodes Df1 to Df3, respectively, which cooperate with the diodes D1 to D3 to provide a diode bridge three-phase full-wave rectification circuit.

An FET control circuit 3 includes a drive signal generating circuit 3A, comparators CM1 to CM3, and resistors Ru to Rw and R1 to R3. In the illustrated embodiment, the AC magneto 1 is connected at the U-phase output terminal 1u thereof through the resistor Ru to both a non-inversion input terminal of the comparator CM1 and an inversion input terminal of the comparator CM3, at the V-phase output terminal thereof through the resistor Rv to both an inversion input terminal of the comparator CM1 and a non-inversion input terminal of the comparator CM2. Also, the AC magneto 1 is connected at the W-phase output terminal 1w through the resistor Rw to both an inversion input terminal of the comparator CM2 and a non-inversion input terminal of the comparator CM3. The comparators CM1 to CM3 have output terminals connected through the resistors R1 to R3 to an output terminal 2a on a positive polarity side of the boosting and rectifying circuit 2, respectively.

The drive signal generating circuit 3A includes power terminals 3a and 3b respectively connected to output terminals 2a and 2b of the boosting and rectifying circuit 2, output terminals 3c1 to 3c3 respectively connected to gates of the MOSFETs F1 to F3, and control terminals 3d1 to 3d3 respectively connected to output terminals of the comparators CM1 to CM3. The drive signal generating circuit 3A generates drive signals VGS1 to VGS3, which are fed through the output terminals 3c1 to 3c3 of the circuit 3A to the gates of the MOSFETs F1 to F3, respectively.

The comparator CM1 functions to carry out comparison between a potential at the output terminals 1u and a potential at the output terminals 1v, resulting in generating a control signal Vs1 kept at a high level during a period of a positive half cycle of a U-phase voltage Vu. The comparator CM2 carries out comparison between the potential at the output terminal 1v and a potential at the output terminal 1w, to thereby generate a control signal Vs2 kept at a high level during a period of a positive half cycle of a V-phase voltage Vv and the comparator CM3 carries out comparison between the potentials at the output terminals 1w and 1, to hereby generate a control signal held at a high level during a period of a positive half cycle of a W-phase voltage Vw. The drive signal generating circuit 3A outputs the above-described drive signals VGS1 to VGS3 through the output terminals 3c1 to 3c3 depending on the control signals Vs1 to Vs3, respectively. The drive signal VSG1, as shown in (B) of FIG. 23, is varied in a rectangular-wave like manner between an on-level and an off-level at a frequency higher than a frequency of an output of the AC magneto during a period of the positive half cycle of the U-phase voltage Vu during which the control signal Vs1 is kept at a high level and is held at the off-level during a period of a negative half cycle of the U-phase voltage Vu during which the control signal Vs1 is at a zero level. The drive signal VGS2, as shown in (C) of FIG. 23, is varied in a rectangular-wave like manner between the on-level and the off-level at a frequency higher than the output frequency of the AC magneto during a period of the positive half cycle of the V-phase voltage Vv during which the control signal Vs2 is kept at a high level and is held at the off-level during a period of a negative half cycle of the V-phase voltage Vv during which the control signal Vs2 is at a zero level. Further, the drive signal VGS3, as shown in (D) of FIG. 23, is varied in a rectangular-wave like manner between the on-level and the off-level at a frequency higher than the output frequency of the AC magneto during a period of the positive half cycle of the W-phase voltage Vw during which the control signal Vs3 is kept at a high level and is held at the off-level during a period of a negative half cycle of the W-phase voltage Vw during which the control signal Vs3 is at a zero level.

The boosting and rectifying circuit 2 includes a smoothing capacitor Co connected between the DC output terminals 2a and 2b thereof, as well as load connection terminals 4a and 4b respectively connected to the DC output terminals 2a and 2b of the power device. Between the load connection terminals 4a and 4b is connected a load RL.

In the thus-constructed embodiment of FIG. 22, the MOSFET of which the parasitic diode has a backward voltage applied thereto is fed with a drive signal of a rectangular waveform and the MOSFET of which the parasitic diode has a forward voltage applied thereto each are fed with a drive signal kept at the on-level. This results in channel loss of the MOSFETs being reduced.

In the embodiment of FIG. 22, the boosting and rectifying circuit 2 is constructed so as to carry out short circuit between each two of all the output terminals of the AC magneto generating a three-phase AC output. Alternatively, the switch circuit may be constructed so as to carry out short circuit with respect to a part of the output terminals of the AC magneto.

Referring now to FIG. 24, a still further embodiment of a power device for an internal combustion engine according to the present invention is illustrated, which is adapted to permit a switch circuit to carry out short circuit between only at least two of the output terminals of the magneto or with respect to a part of the outputs. More particularly, in the embodiment of FIG. 24, the switch circuit is so constructed that of three output terminals 1u to 1w of an AC magneto 1, two output terminals 1u and 1v are subjected to short circuit therebetween. The output terminals 1u and 1v of the AC magneto 1 are respectively connected to drains of MOSFETs F1 and F2 of the N channel type, of which sources are connected together. The output terminal 1w of the AC magneto 1 is connected to a cathode of a diode D3', of which an anode is connected to each of the sources of the MOS-FETs F1 and F2. Further, the output terminals 1u to 1w are respectively connected to anodes of diodes D1 to D3, of which cathodes are connected together.

The output terminals 1u and 1v of the AC magneto 1 are connected through resistors Ra and Rb to a non-inversion input terminal of a comparator CM1 and an inversion input terminal thereof, respectively, of which an output terminal is connected through a resistor R1 to an output terminal 2a on a positive polarity side of a boosting and rectifying circuit 2, as well as to a control terminal 3d of a drive signal generating circuit 3.

The comparator CM1 functions to generate a drive signal Vs which is kept at a high level during a period of a positive half cycle of a U-phase voltage Vu and at a zero level during a period of a negative half cycle thereof.

A drive signal generating circuit 3A may be constructed in substantially the same manner as in the embodiment of FIG. 20. Thus, the drive signal generating circuit 3A, as indicated in (B) and (C) of FIG. 25, generates a drive signal VGS1 of a rectangular waveform and a drive signal VGS2 kept at an on-level during a period of the positive half cycle of the U-phase voltage Vu during which the control signal Vs is kept at a high level, as well as a drive signal VGS1 kept at the on-level and a drive signal VGS2 of a rectangular waveform during a period of the negative half cycle of the voltage Vu during which the control signal Vs is kept at the zero level. The drive signals VGS1 and VGS2 thus generated are fed to gates of the MOSFETs F1 and F2.

In general, when the AC magneto includes n output terminals (n: an integer of 2 or more) and generates a single-phase or polyphase AC voltage, the boosting and rectifying circuit 2 may be constructed so as to carry out short circuit between at least two of the output terminals of the AC magneto or with respect to a part of the output terminals by means of the MOSFETs.

Figure 26:
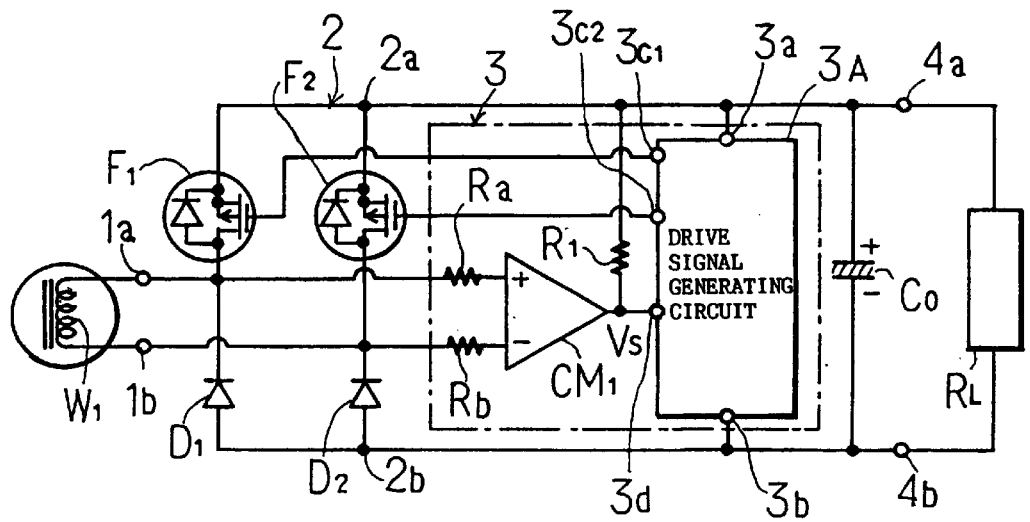
FIG. 26 is a circuit diagram showing an even further embodiment of a power device for an internal combustion engine according to the present invention which is intended to reduce channel loss of a MOSFET.
Figure 27A:
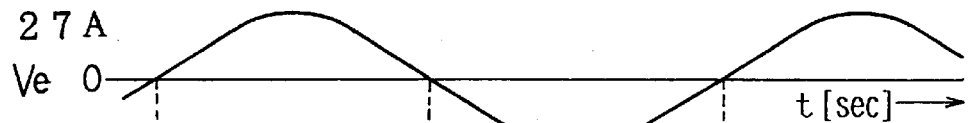
FIG. 27 is a group of waveform diagrams each showing a waveform at each of sections of the power device shown in FIG. 26.
Figure 27B:
Figure 27C:
Figure 27D:
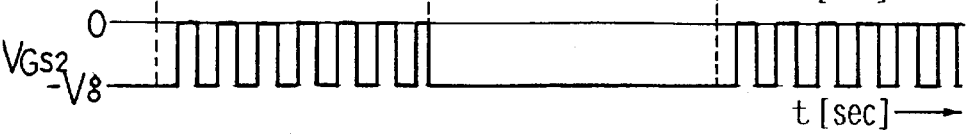

Referring now to FIG. 26, a power device for an internal combustion engine according to the present invention is illustrated, in which MOSFETs of the P channel type are incorporated. More particularly, in the illustrated embodiment, an AC magneto 1 constructed so as to generate a single-phase AC output includes output terminals 1a and 1b respectively connected to drains of MOSFETs F1 and F2 of the P channel type, of which sources are connected together. The output terminals 1a and 1b of the AC magneto are also connected to cathodes of rectification diodes D1 and D2 of which anodes are connected together. The MOSFETs F1 and F2 include parasitic diodes Df1 and Df2, respectively, which cooperate with the diodes D1 and D2 to provide a diode bridge single-phase full-wave rectification circuit.

The output terminals 1a and 1b of the AC magneto 1 are connected through resistors Ra and Rb to a non-inversion input terminal of a comparator CM1 and an inversion input terminal thereof, respectively, of which an output terminal is connected through a resistor R1 to an output terminal 2a of a boosting and rectifying circuit 2. The comparator CM1 functions to compare potentials at the output terminals 1a and 1b of the AC magneto 1 with each other, to thereby generate such a control signal as shown in (B) of FIG. 27.

A drive signal generating circuit 3A includes power terminals 3a and 3b respectively connected to the output terminal 2a of the boosting and rectifying circuit 2 and an output terminal 2b thereof, output terminals 3c1 and 3c2 respectively connected to gates of the MOSFETs F1 and F2, and a control terminal 3d connected to the output terminal of the comparator CM1. The drive signal generating circuit 3A thus constructed outputs such drive signals VGS1 and VGS2 as shown in (C) and (D) of FIG. 27 through the output terminals 3c1 and 3c2, respectively.

In (C) and (D) of FIG. 27, a potential at each of the sources of the MOSFETs F1 and F2 is kept at a zero level. An on-level of a drive signal of each of the MOSFETs of the P channel type means a level which permits a potential at the gate thereof to be reduced by a predetermined level Vg as compared with the potential at the source thereof and an off-level thereof is a level which permits the gate potential to be equal to or slightly higher than the source potential.

In the illustrated embodiment, the drive signal generating circuit 3A generates a drive signal VGS1 kept at the on-level and a drive signal VGS2 of a rectangular waveform varied between the on-level and the off-level during a period for which the comparator CM1 generates a control signal Vs of a high level or a period of a positive half cycle of an output voltage of the AC magneto 1, as well as a drive signal VGS1 of a rectangular waveform varied between the on-level and the off-level and a drive signal VGS2 kept at the on-level during a period for which the comparator CM1 generates a control signal Vs of a zero level or a period of a negative half-cycle of the output voltage of the AC magneto 1.

In general, a MOSFET of the P channel type leads to an increase in channel loss due to a drain current when a drive signal is at the off-level during a period for which the drain current flows from a drain side thereof to a source side thereof or a period for which a forward voltage is applied to a parasitic diode arranged in a drain-source circuit thereof. In the embodiment of FIG. 26, during a period during which a forward voltage is applied to a parasitic diode of each of the MOSFETs F1 and F2, a drive signal fed to a gate-source circuit of each of the MOSFETs is kept at the on-level, so that channel loss may be reduced, leading to a decrease in generation of heat from the MOSFETs.

The embodiments shown in FIGS. 18, 20, 22, 24 and 26 each are constructed in the manner that the MOSFETs each are fed with a drive signal of a rectangular waveform having a predetermined frequency during a period for which a backward voltage is applied to the parasitic diode of the MOSFET. Alternatively, each of the embodiment may be constructed so as to permit the FET control circuit 3 to exhibit a voltage adjusting function of controlling a duty cycle of a drive signal of a rectangular waveform fed to each of the MOSFETs depending on an output voltage of the boosting and rectifying circuit 2, to thereby keep a voltage applied to the load at a set level or below.

Also, in order to prevent an excessive voltage from being applied to the load, a rectification power circuit which exhibits a voltage adjusting function of keeping an output voltage of the AC magneto at a level of a adjusted value or below may be separately provided, to thereby permit the FET control circuit 3 to exhibit a function of interrupting boosting operation due to on-off operation of the MOSFETs when a voltage applied to the load is set at a level substantially lower than the adjusted value of the rectification power circuit.

Further, a switch may be arranged between the FET control circuit and the gate of each of the MOSFETs, which switch is closed to permit a drive signal to be fed from the FET control circuit to each of the MOSFETs for boosting operation at the time of starting of the internal combustion engine and rendered open to interrupt the boosting operation after starting of the engine.

As can be seen from the foregoing, the present invention is so constructed that the switch circuit constituted by the MOSFETs each exhibiting a function like a resistor selectively interrupts a short-circuit current fed to the generating coil of the AC magneto, to thereby boost an output voltage of the magneto. Thus, the present invention permits a short-circuit current to be fed through the MOSFETs to the generating coil even when an output voltage of the AC magneto is at a highly low level, resulting in an electric power being fed to the load even during quite low speed operation of the engine.

Also, the present invention is constructed so as to keep a drive signal of each of the MOSFETs constituting the switch circuit changed into a shape like a rectangular waveform during a period for which a backward voltage is applied to the parasitic diode of the MOSFET and keep the drive signal at the on-level during a period for which a forward voltage is applied to the parasitic diode. Such construction reduces channel loss of the MOSFET occurring during the period for which the forward voltage is applied to the parasitic diode of the MOSFET. This reduces generation of heat from the MOSFET, to thereby small-size a heat sink for the MOSFET, resulting in the power device being smallsized.

While preferred embodiments of the invention have been described with reference to the drawings, obvious modifications and variations are possible in light of the above teachings. It is therefore to be understood that within the scope of the appended claims, the invention may be practiced otherwise than as specifically described.

What is claimed is:

1. A power device for an internal combustion engine, comprising:

an AC magneto including n (n: an integer of 2 or more) output terminals and driven by the internal combustion engine to generate a single-phase or polyphase AC output from said n output terminals;

m (m: an integer between 2 and n) MOSFETs arranged in such a manner that drains and sources thereof are respectively arranged on identical sides, ones of said drains and sources are connected together and the others of said drains and sources are respectively connected to m output terminals of said AC magneto;

said m MOSFETs each including a drain-source circuit having a parasitic diode therein;

2n-m rectification diodes arranged so as to cooperate with said parasitic diodes to constitute a diode bridge full-wave rectification circuit for rectifying the AC output of said AC magneto; and a FET control circuit for feeding each of gates of said m MOSFETs with a drive signal to accomplish flowing of a short-circuit current through said MOSFETs by carrying out short circuit between each two of said m output terminals of said AC magneto and interruption of said flowing of said short-circuit current plural times during a period of a half cycle of the AC output to be short-circuited; and said drive signal having a rectangular waveform having an identical phase and a frequency higher than a frequency of the output of said AC magneto to concurrently subject said m MOSFETs to on-off operation.

2. A power device for an internal combustion engine, comprising:

an AC magneto including n (n: an integer of 2 or more) output terminals and driven by the internal combustion engine to generate a single-phase or polyphase AC output from said n output terminals;

m (m: an integer between 2 and n) MOSFETs arranged in such a manner that drains and sources thereof are respectively arranged on identical sides, ones of said drains and sources are connected together and the others of said drains and sources are respectively connected to m output terminals of said AC magneto;

said m MOSFETs each including a drain-source circuit having a parasitic diode therein;

2n-m rectification diodes arranged so as to cooperate with said parasitic diodes to constitute a diode bridge full-wave rectification circuit for rectifying the AC output of said AC magneto; and a FET control circuit for feeding each of gates of said m MOSFETs with a drive signal comprising a circuit constructed in such a manner wherein a backward voltage is applied to said parasitic diode arranged in said drain-source circuit thereof each are fed at said gate-source circuit thereof with a drive signal of a rectangular waveform which is varied at a frequency higher than a frequency of the output of said AC magneto between an on-level which renders the MOSFET turned on and an off-level which renders it turned off and MOSFETs wherein a forward voltage is applied to said parasitic diode each are fed at said gate-source circuit thereof with a drive signal which keeps the MOSFET at an on-level during a period of time for which the forward voltage is applied to said parasitic diode.

3. A power device for an internal combustion engine, comprising:

an AC magneto including n (n: an integer of 2 or more) output terminals and driven by the internal combustion engine to generate a single-phase or polyphase AC output from said n output terminals;

n MOSFETs of the N channel type of which drains are respectively connected to said n output terminals of said AC magneto and source are connected together;

said n MOSFETs each including a drain-source circuit having a parasitic diode therein;

n rectification diodes having anodes respectively connected to said drains of said n MOSFETs and cathodes connected together and cooperating with said parasitic diodes to constitute a full-wave rectification circuit for rectifying the AC output of said AC magneto; and a FET control circuit for feeding each of gates of said n MOSFETs with a drive signal of a rectangular waveform having an identical phase and a frequency higher than a frequency of the output of said AC magneto to concurrently subject said n MOSFETs to on-off operation to accomplish flowing of a short-circuit current through said MOSFETs by carrying out short circuit between each two of said n output terminals of said AC magneto and interruption of said flowing of said short-circuit current plural times during a period of a half cycle of the AC output to be short-circuited.

4. A power device for an internal combustion engine, comprising:

an AC magneto including n (n: an integer of 2 or more) output terminals and driven by the internal combustion engine to generate a single-phase or polyphase AC output from said n output terminals;

n MOSFETs of the N channel type of which drains are respectively connected to said n output terminals of said AC magneto and source are connected together;

said n MOSFETs each including a drain-source circuit having a parasitic diode therein;

n rectification diodes having anodes respectively connected to said drains of said n MOSFETs and cathodes connected together and cooperating with said parasitic diodes to constitute a full-wave rectification circuit for rectifying the AC output of said AC magneto; and a FET control circuit comprising a circuit constructed in such a manner that MOSFETs wherein a backward voltage is applied to said parasitic diode in said drain-source circuit thereof each are fed at said gate-source circuit thereof with a drive signal of a rectangular waveform which is varied at a frequency higher than a frequency of the output of said AC magneto between an on-level which renders the MOSFET turned on and an off-level which renders it turned off and MOSFETs wherein a forward voltage is applied to said parasitic diode each are fed at said gate-source circuit thereof with a drive signal which keeps the MOSFET at an on-level during a period of time for which the forward voltage is applied to said parasitic diode.

5. A power device for an internal combustion engine, comprising:

an AC magneto including n (n: an integer of 2 or more) output terminals and driven by the internal combustion engine to generate a single-phase or polyphase AC output from said n output terminals;

n MOSFETs of the N channel type of which sources are respectively connected to said n output terminals of said AC magneto and drains are connected together;

said n MOSFETs each including a drain-source circuit having a parasitic diode therein;

n rectification diodes having cathodes respectively connected to said sources of said n MOSFETs and anodes connected together and cooperating with said parasitic diodes to constitute a diode bridge full-wave rectification circuit for rectifying the AC output of said AC magneto;

a FET control circuit for feeding each of gates of said n MOSFETs with a drive signal to accomplish flowing of a short-circuit current through said MOSFETs by carrying out short circuit between each two of said n output terminals of said AC magneto and interruption of said flowing of said short-circuit current plural times during a period of a half cycle of the AC output to be short-circuited; and said drive signal having a rectangular waveform having an identical phase and a frequency higher than a frequency of the output of said AC magneto to concurrently subject said n MOSFETs to on-off operation.

6. A power device for an internal combustion engine, comprising:

an AC magneto including n (n: an integer of 2 or more) output terminals and driven by the internal combustion engine to generate a single-phase or polyphase AC output from said n output terminals;

n MOSFETs of the N channel type of which sources are respectively connected to said n output terminals of said AC magneto and drains are connected together;

said n MOSFETs each including a drain-source circuit having a parasitic diode therein;

n rectification diodes having cathodes respectively connected to said sources of said n MOSFETs and anodes connected together and cooperating with said parasitic diodes to constitute a diode bridge full-wave rectification circuit for rectifying the AC output of said AC magneto; and a FET control circuit comprising a circuit constructed in such a manner that MOSFETs wherein a backward voltage is applied to said parasitic diode in said drain-source circuit thereof each are fed at said gate-source circuit thereof with a drive signal of a rectangular waveform which is varied at a frequency higher than a frequency of the output of said AC magneto between an on-level which renders the MOSFET turned on and an off-level which renders it turned off and MOSFETs wherein a forward voltage is applied to said parasitic diode each are fed at said gate-source circuit thereof with a drive signal which keeps the MOSFET at an on-level during a period of time for which the forward voltage is applied to said parasitic diode.

7. A power device for an internal combustion engine, comprising:

an AC magneto including n (n: an integer of 2 or more) output terminals and driven by the internal combustion engine to generate a single-phase or polyphase AC output from said n output terminals;

n MOSFETs of the P channel type of which drains are respectively connected to said n output terminals of said AC magneto and sources are connected together;

said n MOSFETs each including a drain-source circuit having a parasitic diode therein;

n rectification diodes having cathodes respectively connected to said drains of said n MOSFETs and anodes connected together and cooperating with said parasitic diodes to constitute a diode bridge full-wave rectification circuit for rectifying the AC output of said AC magneto;

a FET control circuit for feeding each of gates of said n MOSFETs with a drive signal to accomplish flowing of a short-circuit current through said MOSFETs by carrying out short circuit between each two of said n output terminals of said AC magneto and interruption of said flowing of said short-circuit current plural times during a period of a half cycle of the AC output to be short-circuited; and said drive signal having a rectangular waveform having an identical phase and a frequency higher than a frequency of the output of said AC magneto to concurrently subject said n MOSFETs to on-off operation.

8. A power device for an internal combustion engine, comprising:

an AC magneto including n (n: an integer of 2 or more) output terminals and driven by the internal combustion engine to generate a single-phase or polyphase AC output from said n output terminals;

n MOSFETs of the P channel type of which drains are respectively connected to said n output terminals of said AC magneto and sources are connected together;

said n MOSFETs each including a drain-source circuit having a parasitic diode therein;

n rectification diodes having cathodes respectively connected to said drains of said n MOSFETs and anodes connected together and cooperating with said parasitic diodes to constitute a diode bridge full-wave rectification circuit for rectifying the AC output of said AC magneto; and a FET control circuit comprising a circuit constructed in such a manner that MOSFETs wherein a backward voltage is applied to said parasitic diode in said drain-source circuit thereof each are fed at said gate-source circuit thereof with a drive signal of a rectangular waveform which is varied at a frequency higher than a frequency of the output of said AC magneto between an on-level which renders the MOSFET turned on and an off-level which renders it turned off and MOSFETs wherein a forward voltage is applied to said parasitic diode each are fed at said gate-source circuit thereof with a drive signal which keeps the MOSFET at an on-level during a period of time for which the forward voltage is applied to said parasitic diode.

9. A power device for an internal combustion engine, comprising:

an AC magneto including n (n: an integer of 2 or more) output terminals and driven by the internal combustion engine to generate a single-phase or polyphase AC output from said n output terminals;

n MOSFETs of the P channel type of which sources are respectively connected to said n output terminals of said AC magneto and drains are connected together;

said n MOSFETs each including a drain-source circuit having a parasitic diode therein;

n rectification diodes having anodes respectively connected to said sources of said n MOSFETs and cathodes connected together and cooperating with said parasitic diodes to constitute a diode bridge full-wave rectification circuit for rectifying the AC output of said AC magneto;

a FET control circuit for feeding each of gates of said n MOSFETs with a drive signal to accomplish flowing of a short-circuit current through said MOSFETs by carrying out short circuit between each two of said n output terminals of said AC magneto and interruption of said flowing of said short-circuit current plural times during a period of a half cycle of the AC output to be short-circuited: and said drive signal having a rectangular waveform having an identical phase and a frequency higher than a frequency of the output of said AC magneto to concurrently subject said n MOSFETs to on-off operation.

10. A power device for an internal combustion engine, comprising:

an AC magneto including n (n: an integer of 2 or more) output terminals and driven by the internal combustion engine to generate a single-phase or polyphase AC output from said n output terminals;

n MOSFETs of the P channel type of which sources are respectively connected to said n output terminals of said AC magneto and drains are connected together;

said n MOSFETs each including a drain-source circuit having a parasitic diode therein;

n rectification diodes having anodes respectively connected to said sources of said n MOSFETs and cathodes connected together and cooperating with said parasitic diodes to constitute a diode bridge full-wave rectification circuit for rectifying the AC output of said AC magneto; and a FET control circuit comprising a circuit constructed in such a manner that MOSFETs wherein a backward voltage is applied to said parasitic diode in said drain-source circuit thereof each are fed at said gate-source circuit thereof with a drive signal of a rectangular waveform which is varied at a frequency higher than a frequency of the output of said AC magneto between an on-level which renders the MOSFET turned on and an off-level which renders it turned off and MOSFETs wherein a forward voltage is applied to said parasitic diode each are fed at said gate-source circuit thereof with a drive signal which keeps the MOSFET at an on-level during a period of time for which the forward voltage is applied to said parasitic diode.

* * * * *